United States Patent
Rao et al.

(10) Patent No.: US 12,493,347 B2
(45) Date of Patent: Dec. 9, 2025

(54) EGOCENTRIC GAZE ESTIMATION

(71) Applicant: QUALCOMM Incorporated, San Diego, CA (US)

(72) Inventors: Shivansh Rao, Sunnyvale, CA (US); Saurav Gupta, Bangalore (IN); Nirmal Elamon, San Diego, CA (US); Arunkumar Nehrur Ravi, San Diego, CA (US); Vasudev Bhaskaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/660,004

(22) Filed: May 9, 2024

(65) Prior Publication Data

US 2025/0348135 A1 Nov. 13, 2025

(51) Int. Cl.
*G06F 3/01* (2006.01)
*G06F 3/16* (2006.01)
(52) U.S. Cl.
CPC ............... *G06F 3/013* (2013.01); *G06F 3/16* (2013.01)
(58) Field of Classification Search
CPC .......................................................... G06F 3/16
See application file for complete search history.

(56) References Cited

U.S. PATENT DOCUMENTS 12,141,347 B1 * 11/2024 Souden .................. G06F 3/013
2020/0342234 A1 * 10/2020 Gan ........................ G06V 20/46
2021/0209365 A1 * 7/2021 Scott, II ................. G10L 15/26

OTHER PUBLICATIONS

Huang C., et al., "Egocentric Audio-Visual Object Localization", arXiv:2303.13471v1 [cs.CV] Mar. 23, 2023, 17 Pages.
Huang Y., et al., "Mutual Context Network for Jointly Estimating Egocentric Gaze and Action", IEEE Transactions on Image Processing, arXiv:1901.01874v4 [cs.CV] Jun. 30, 2020, pp. 1-13.
Lai B., et al., "In the Eye of Transformer: Global-Local Correlation for Egocentric Gaze Estimation", arXiv:2208.04464v2 [cs.CV] Aug. 10, 2022, pp. 1-23.
Mo S., et al., "Audio-Visual Grouping Network for Sound Localization from Mixtures", arXiv:2303.17056v1 [cs.CV] Mar. 29, 2023, 12 Pages.
Ghosh S., et a., "Automatic Gaze Analysis: a Survey of Deep Learning Based Approaches", arXiv:2108.05479v1, Cornell University Library, 201 Olin Library Cornell University Ithaca, NY 14853, Aug. 12, 2021, pp. 1-20, XP091031535, the whole document abstract p. 10 table 2 4.2.4 VAE/GAN based; p. 8, col. 2.
International Search Report and Written Opinion—PCT/US2025/019022—ISA/EPO—Jun. 3, 2025.

(Continued)

*Primary Examiner* — Priyank J Shah
(74) *Attorney, Agent, or Firm* — QUALCOMM Incorporated; Espartaco Diaz Hidalgo

(57) ABSTRACT

Certain aspects of the present disclosure provide techniques for estimating an egocentric gaze of a user in an environment, including inputting, into a machine learning (ML) architecture, a video input corresponding to the environment and an audio input corresponding to the environment; and obtaining, from the ML architecture, an estimate of the egocentric gaze of the user in the environment based on the video input and the audio input.

20 Claims, 10 Drawing Sheets

(56) References Cited

OTHER PUBLICATIONS

Lai B., et al., "Listen to Look into the Future: Audio-Visual Egocentric Gaze Anticipation", ARXIV: 2305.03907V3, arxiv.org, Cornell University Library, 201 Olin Library Cornell University Ithaca, NY 14853, pp. 1-30, Mar. 22, 2024, XP091707034, the whole document abstract figures 1-2,4,6 p. 5-p. 8 p. 26 last paragraph, p. 25.
Lai B., et al., "Listen to Look into the Future: Audio-Visual Egocentric Gaze Anticipation", arXiv:2305.03907v3 [cs.CV] Mar. 22, 2024, pp. 1-30.
Nugroho M A., et al., "Audio-visual Glance Network for Efficient Video Recognition", 2023 IEEE/CVF International Conference on Computer Vision (ICCV), IEEE, Oct. 1, 2023, pp. 10116-10125, XP034514121, the whole document, abstract figures 3-5 p. 3.
Ryan F., et al., "Egocentric Auditory Attention Localization in Conversations", 2023 IEEE/CVF Conference on Computer Vision and Pattern Recognition (CVPR), EEE, Jun. 17, 2023, pp. 14663-14674, XP034402675, the whole document abstract figure 2 pp. 2,4 p. 4, col. 2, last paragraph.

* cited by examiner

EGOCENTRIC GAZE ESTIMATION

INTRODUCTION

Field of the Disclosure

Aspects of the present disclosure relate to gaze estimation, and more particularly, to techniques for egocentric gaze estimation.

DESCRIPTION OF RELATED ART

Egocentric gaze estimation has become increasingly important in various fields, such as virtual reality, augmented reality, and human-computer interaction. Accurately determining where a user is looking within their field of view enables a wide range of applications, including user attention analysis, interactive gaming, and assistive technologies. Conventional gaze estimation techniques often rely on eye-tracking devices or visual analysis of the user's eye movements. However, these approaches have limitations in terms of accuracy, reliability, and practicality.

Eye-tracking devices, such as infrared cameras or electrooculography sensors, can provide precise gaze measurements but require specialized hardware and calibration procedures. These devices may be intrusive, expensive, and not readily available in everyday settings. Moreover, eye-tracking systems often suffer from issues such as drift, calibration errors, and sensitivity to head movements, which can degrade the accuracy of gaze estimation over time. Visual analysis techniques, on the other hand, attempt to estimate gaze direction based on the appearance of the user's eyes in images or videos. These methods typically involve detecting and tracking eye features, such as the pupil or iris, and mapping their positions to gaze coordinates. However, visual analysis approaches can be challenging due to variations in lighting conditions, occlusions, and the complexity of eye morphology.

Advances in machine learning and computer vision have led to the development of more complex gaze estimation techniques. These methods often employ deep neural networks to learn the mapping between eye appearance and gaze direction from large datasets of eye images. Convolutional neural networks (CNNs) have been particularly successful in extracting relevant features from eye images and predicting gaze coordinates. However, these learning-based approaches still face challenges in terms of generalization across different users, head poses, and environmental conditions. Additionally, most existing methods rely solely on visual information and do not exploit the potential benefits of incorporating other modalities, which can provide complementary information for gaze estimation. Accordingly, more reliable and accurate techniques to obtain egocentric gaze for users may be desired.

SUMMARY

One aspect provides a method for estimating an egocentric gaze of a user in an environment. In examples, the method may include inputting, into a machine learning (ML) architecture, a video input corresponding to the environment and an audio input corresponding to the environment; and obtaining, from the ML architecture, an estimate of the egocentric gaze of the user in the environment based on the video input and the audio input.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
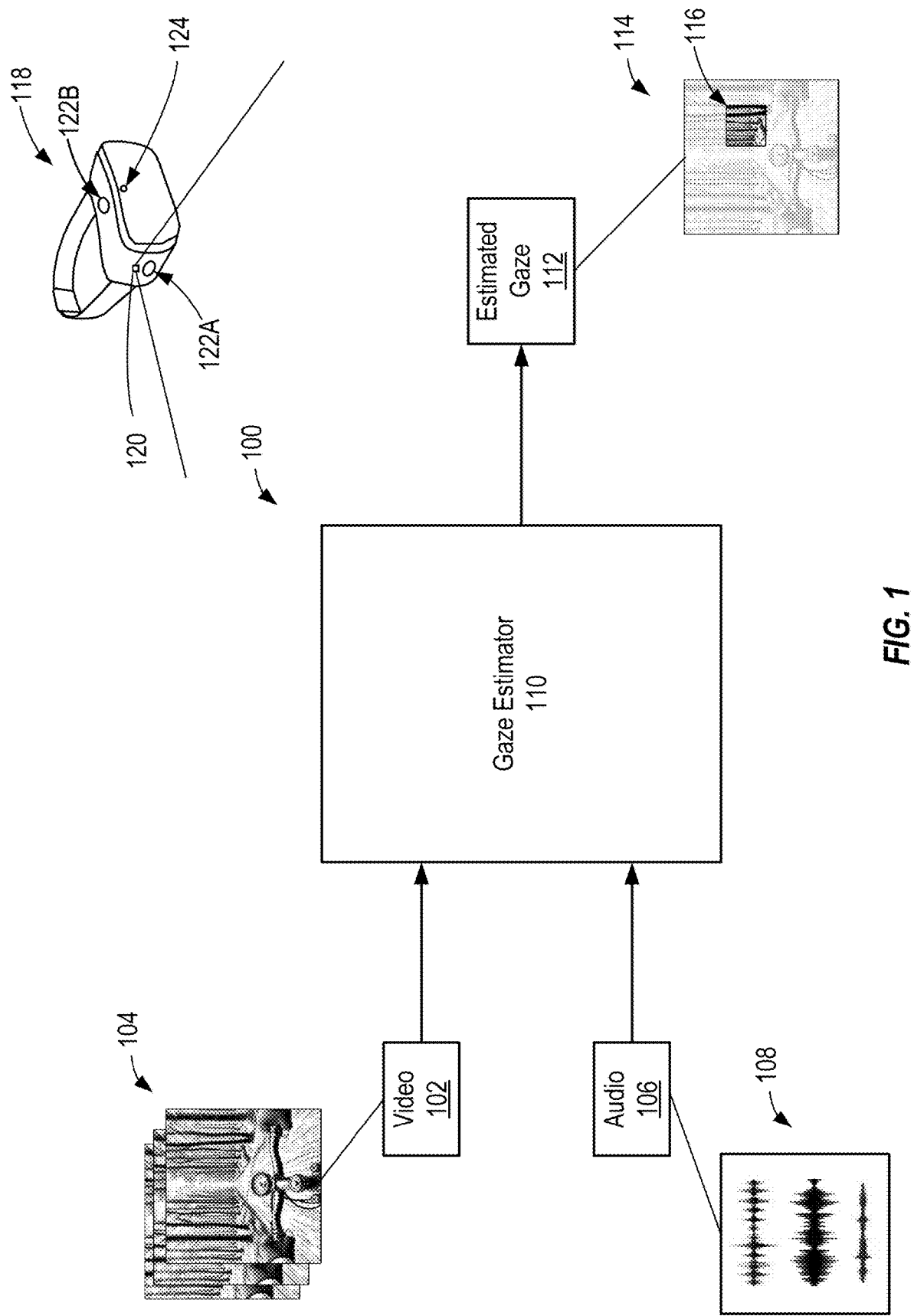
FIG. 1 depicts an example system for estimating an egocentric gaze of a user in an environment in accordance with at least one example of the present disclosure.

Aspects of the present disclosure provide apparatuses, methods, processing systems, and computer-readable mediums for estimating an egocentric gaze of a user in an environment using audio and visual inputs.

Egocentric gaze estimation plays an important role in various applications such as virtual reality, augmented reality, and human-computer interaction. Accurately determining where a user is looking within their field of view enables a wide range of use cases, such as user attention analysis, interactive gaming, and assistive technologies. As previously discussed, conventional gaze estimation techniques often rely on eye-tracking devices or visual analysis of the user's eye movements. However, these approaches have limitations in terms of accuracy, reliability, and practicality, particularly in dynamic and complex real-world environments.

Egocentric gaze estimation faces several technical challenges. First, relying only on visual inputs can lead to inaccurate or incomplete gaze predictions when the relevant gaze cues are outside the field of view or occluded. For example, in scenarios where the user's gaze is directed towards an object or person that is not visible in the captured visual data, visual-only methods may fail to accurately estimate the gaze direction. Second, the complex and dynamic nature of real-world environments makes it difficult to capture and model the various factors influencing gaze behavior. The presence of multiple objects in the environment can create ambiguities and distractions that complicate the gaze estimation task. Third, the inherent ambiguity and uncertainty in gaze estimation require robust techniques that can handle noisy and inconsistent inputs. The variability in eye appearance, head pose, and environmental conditions can introduce significant noise and uncertainty in the gaze estimation process.

Certain aspects of the present disclosure address these technical problems by utilizing a multimodal approach that leverages both audio and visual inputs for egocentric gaze estimation. Certain aspects discussed herein utilize a dual-branch architecture (though in certain aspects, only one branch architecture may be used including one of the branches) that combines a correlation between audio and visual features with one or more generated visual features. In examples, the feature correlation branch can capture the joint spatial, temporal, and semantic relationships between the audio and visual inputs (e.g., audio features and video features). In certain aspects, such relationships can be captured using attention mechanisms. By learning the correlations and dependencies between the two modalities, certain aspects discussed herein can utilize information provided by audio cues to enhance the gaze estimation accuracy. The generated features branch may generate one or more possible visual features that are consistent with the audio input, even in the presence of occlusions or missing visual information. This may allow certain aspects to infer and generate relevant visual cues that may not be directly observable in the captured visual data, enabling more robust gaze estimation in challenging scenarios.

Certain aspects discussed herein can utilize machine-learning techniques, such as deep neural networks and attention mechanisms, to model and integrate the audio-visual information for gaze estimation. Certain aspects of the feature correlation branch can use self-attention and/or cross-attention mechanisms to capture the spatial and temporal dependencies between the audio and visual features. These attention mechanisms may allow the system to focus on the most relevant and informative cues for gaze estimation, adaptively weighting the contributions of different audio-visual features based on their importance. Certain aspects of the generated features branch utilize generative adversarial networks (GANs) and/or variational autoencoders (VAEs) to generate possible visual features that are consistent with the audio input. By conditioning the visual feature generation on the audio cues, an estimation of egocentric eye gaze can be based on inferred and generated visual information that may not be directly observable, enhancing gaze estimation when occlusions may occur or when visual data is missing.

The technical solutions provided by aspects of the present disclosure may offer several benefits and advantages over existing gaze estimation methods. As a first example, by leveraging both audio and visual inputs, the proposed system may generate more accurate and robust gaze predictions, such as in challenging scenarios where visual information alone is insufficient. The incorporation of audio cues may provide complementary information that may help disambiguate and refine the gaze estimates, such as when relevant visual cues are occluded or outside the field of view. As a second example, generating one or more features may enable the use of plausible visual features that are consistent with the audio input, which may enhance the gaze estimation capabilities in the presence of occlusions or missing visual information. This may allow the system to infer and generate relevant visual cues that may not be directly observable, which may improve the robustness and reliability of gaze estimation. As a third example, the attention mechanisms used in the audio-visual feature correlation branch may allow the system to focus on the most relevant and informative cues for gaze estimation, which may improve the efficiency and effectiveness of the gaze prediction process. By adaptively weighting the contributions of different audio-visual features based on their importance, the system may effectively handle the complexities and ambiguities present in real-world environments.

Furthermore, the multimodal approach provided by aspects of the present disclosure may enable a more complete solution for performing egocentric gaze estimation. In virtual reality and augmented reality systems, accurate gaze estimation may enhance the user experience by enabling more natural and intuitive interactions with virtual objects and environments. By leveraging both audio and visual cues, certain aspects of the proposed system may provide more precise and stable gaze tracking, even in the presence of occlusions or dynamic scene changes. By incorporating audio cues, aspects of the present disclosure may provide gaze-based input even when the user's eyes are not directly visible or when the visual data is of low quality. Moreover, certain aspects can be applied to various other domains, such as driver monitoring systems in automotive applications, where the integration of audio and visual information can provide a more comprehensive understanding of the driver's attention and gaze behavior.

Technical solutions provided by certain aspects of the present disclosure may offer significant benefits and advantages over visual-only gaze estimation methods, which may enable a wide range of applications in virtual reality, augmented reality, human-computer interaction, and elsewhere.

For example, in virtual reality and augmented reality systems, accurate estimation of the user's gaze direction is important for providing immersive and interactive experiences. By performing egocentric gaze estimation as described herein, virtual reality and augmented reality applications can track the user's attention and adapt the content or user interface accordingly. For instance, in a virtual training scenario, the system can use gaze estimation to determine which objects or instructions the user is focusing on and provide relevant guidance or feedback.

Another implementation is in the automotive industry, particularly in the development of advanced driver assistance systems (ADAS) and autonomous vehicles. By integrating the egocentric gaze estimation techniques described herein into the vehicle's sensing and perception pipeline, the system can monitor the driver's attention and alertness levels. This information can be used to detect distracted or drowsy driving and provide timely warnings or interventions. Furthermore, in semi-autonomous or fully autonomous vehicles, gaze estimation can help the vehicle understand the driver's intentions and anticipate their actions, enabling a more seamless and collaborative interaction between the human and the machine.

Example System for Performing Egocentric Gaze Estimation

FIG. 1 illustrates an example system 100 for estimating an egocentric gaze of a user in an environment. In certain aspects, the system 100 includes a gaze estimator 110 configured to receive a video input 102 corresponding to the environment and an audio input 106 corresponding to the environment. The gaze estimator 110 may be configured to estimate the egocentric gaze of the user based on the video input 102 and the audio input 106.

As depicted in FIG. 1, the example system 100 receives a video input 102. The video input 102 may include one or more video frames 104 captured by an image sensor, such as a camera. The video frames 104 may depict the environment from the perspective of the user. For example, the video frames 104 may show objects, people, or scenes that are within the field of view of the user.

In certain aspects, the system 100 also includes an audio input 106. The audio input 106 may include one or more audio signals 108 captured by an audio sensor, such as a microphone. The audio signals 108 may correspond to sounds present in the environment, such as speech, music, or ambient noise. In some examples, the audio input 106 may include multiple audio channels (e.g., n-channel audio), where each channel may correspond to a different audio sensor or a different spatial location.

In certain aspects, the video input 102 and the audio input 106 are provided to the gaze estimator 110. In examples, the gaze estimator 110 is configured to estimate the egocentric gaze of a user based on the video input 102 and the audio input 106. The gaze estimator 110 may use various techniques, such as machine learning algorithms, to analyze the video frames 104 and the audio signals 108 and determine the direction or location of the user's gaze within the environment.

In certain aspects, the gaze estimator 110 outputs an estimated gaze 112, which represents the predicted direction or location of the user's gaze. The estimated gaze 112 may be represented in various formats, such as a gaze vector, a gaze point, a gaze region, and/or may be represented as a two-dimensional heat map illustrating most likely gaze locations. In the example shown in FIG. 1, the estimated gaze 112 is illustrated as an estimated gaze location 116 overlaid on an example output frame 114. The example output frame 114 may be one of the video frames 104 from the video input 102, or it may be a separate frame generated by the gaze estimator 110 for visualization purposes. The example output frame 114 depicts an example estimated gaze location 116, which corresponds to the predicted location of the user's gaze within the environment. The example estimated gaze location 116 is depicted as a square marker or a highlight on the example output frame 114, indicating the region where the user is likely to be looking. Of course, other representations indicating the egocentric gaze of a user as generated by the gaze estimator 110 are contemplated.

In certain aspects, an example head-mounted display (HMD) 118 may incorporate a portion of or the entirety of the gaze estimation system 100 (e.g., represented as example system 120 of the HMD 118). The HMD 118 may be a virtual reality headset, an augmented reality headset, or any other type of wearable device that includes display elements positioned in front of the user's eyes. The HMD 118 may include various sensors and components for capturing the video input 102 and the audio input 106. The example system 120 shown in FIG. 1 represents an implementation of the gaze estimator 110 and the estimated gaze 112 output within the HMD 118. The example system 120 may include additional components, such as processors, memory, and communication interfaces, to perform the gaze estimation functionality.

In certain aspects, the HMD 118 can include one or more audio sensors 122A and 122B, which are configured to capture the audio input 106. The audio sensors 122A and 122B may be microphones or other types of acoustic sensors that can detect sounds from the environment. In the example shown in FIG. 1, there are two audio sensors 122A and 122B, which may be positioned on different sides of the HMD 118 to capture audio from different spatial locations. However, the system may include any number of audio sensors arranged in various configurations.

In certain aspects, the HMD 118 includes one or more image sensor(s) 124, which are configured to capture the video input 102. The image sensor(s) 124 may be cameras or other types of optical sensors that can capture visual information from the environment. The image sensor(s) 124 may be positioned on the front, sides, or any other suitable location on the HMD 118 to capture the user's field of view. The system may include multiple image sensors to capture different perspectives or to enable stereoscopic vision.

Example Gaze Estimator

Figure 2:
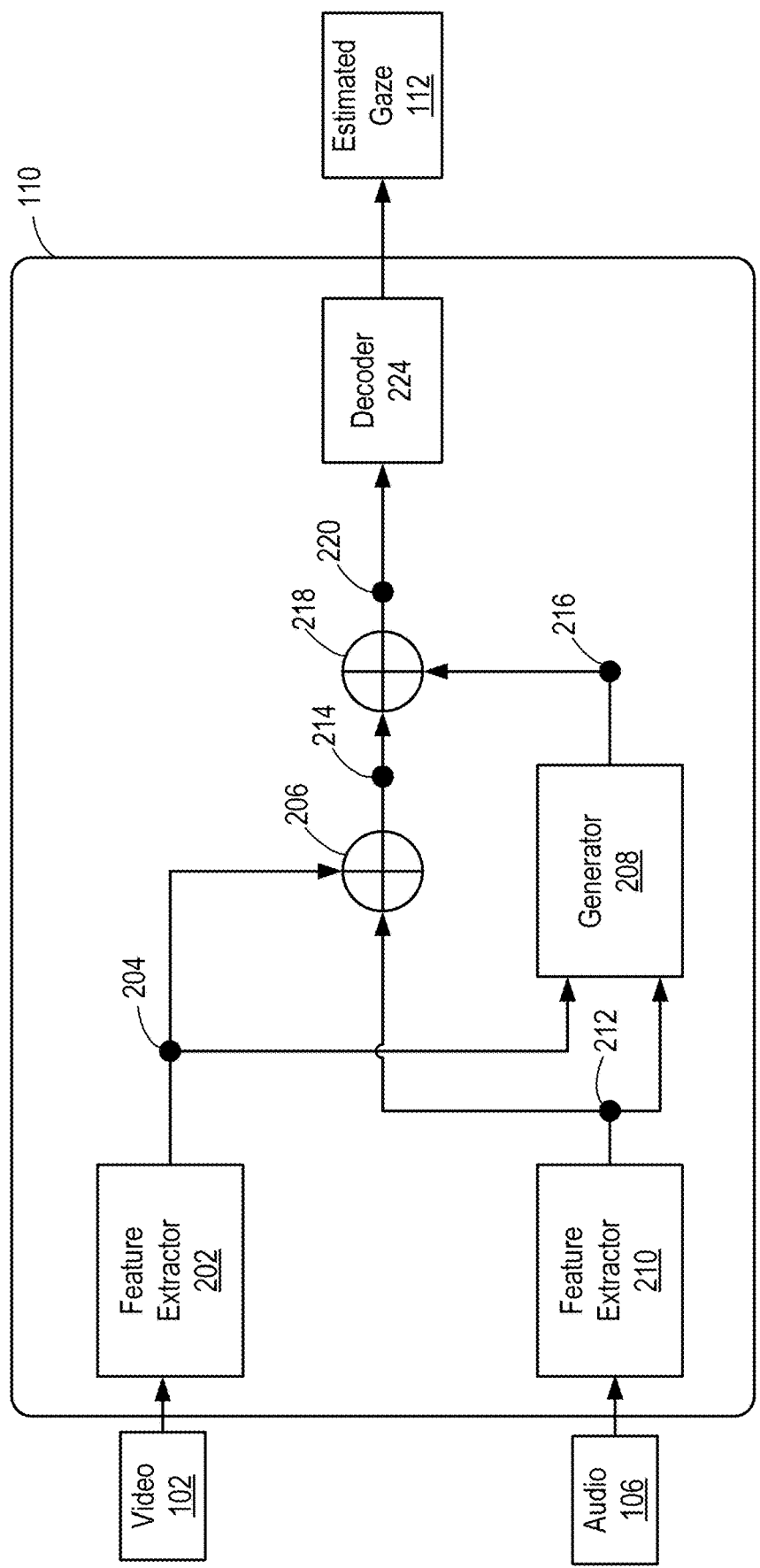
FIG. 2 depicts additional details of a gaze estimator in accordance with at least one example of the present disclosure.

FIG. 2 illustrates additional details of an example of the gaze estimator 110 described in FIG. 1. In certain aspects, the gaze estimator 110 includes a feature extractor 202, a feature extractor 210, a generator 208, and a decoder 224. The feature extractor 202 is configured to extract visual features 204 from the video input 102, while the feature extractor 210 is configured to extract audio features 212 from the audio input 106. The generator 208 is configured to generate one or more generated visual features 216 based on the visual features 204 and the audio features 212 from the feature extractor 202 and feature extractor 210 respectively. The decoder 224 is configured to generate an estimated egocentric gaze 112 based on the one or more generated visual features 216 and correlated features between the visual features 204 and the audio features 212 from the feature extractor 202 and feature extractor 210 respectively.

In certain aspects, the feature extractor 202 is a visual feature extractor configured to extract visual features 204 from the video input 102. In examples, the feature extractor 202 may implement one or more convolutional neural networks to process visual data and extract the visual features 204. In certain aspects, the feature extractor 202 may include multiple layers of convolutional filters, pooling operations, and activation functions, which progressively transform images and/or video frames into a set of visual features 204 that capture relevant information for gaze estimation. The feature extractor 202 may be pre-trained on a large dataset of images or videos to learn general visual representations. Subsequently, the feature extractor 202 may be fine-tuned on a specific dataset related to gaze estimation to adapt the learned features for specific use in egocentric gaze estimation.

In certain aspects, the feature extractor 202 outputs a set of visual features 204, which can reside in a visual latent space. The visual latent space may be a high-dimensional representation space where the visual features 204 are encoded. In certain aspects, each visual feature in the visual features 204 corresponds to a specific spatial location or region in the input video frames, and captures the visual characteristics of that location or region.

The dimensionality of the visual latent space and the number of visual features 204 may vary depending on the architecture of the feature extractor 202 and the desired level of granularity. For example, the visual features 204 may have a spatial resolution of 8×8, 16×16, or 32×32, depending on the size of the receptive fields of the convolutional filters in the feature extractor 202. The visual features 204 may also have a certain number of channels, each representing a different aspect or attribute of the visual input, such as edges, textures, or semantic concepts.

In certain aspects, the gaze estimator 110 includes a feature extractor 210 configured to extract audio features 212 from the audio input 106. The feature extractor 210 may be implemented using various techniques, such as convolutional neural networks, recurrent neural networks, or transformer models, which are well-suited for processing temporal or sequential data like audio.

The feature extractor 210 may include multiple layers of convolutional filters, pooling operations, and activation functions, which progressively transform the audio input into a set of audio features 212 that capture the relevant information for gaze estimation. The feature extractor 210 may also include temporal modeling components, such as long short-term memory (LSTM) units or gated recurrent units (GRUs), to capture the temporal dependencies and dynamics in the audio input 106.

The feature extractor 210 may be pre-trained on a large dataset of audio recordings to learn general audio representations. Subsequently, the feature extractor 210 may be fine-tuned on a specific dataset related to gaze estimation to adapt the learned features for specific use in egocentric gaze estimation. The feature extractor 210 outputs a set of audio features 212, which reside in an audio latent space. In certain aspects, the audio latent space is a high-dimensional representation space where the audio features are encoded. Each audio feature in the audio features 212 may correspond to a specific temporal location or segment in the audio input 106, and captures the audio characteristics of that location or segment.

The dimensionality of the audio latent space and the number of audio features 212 may vary depending on the architecture of the feature extractor 210 and the desired level of granularity. For example, the audio features 212 may have a temporal resolution of 10 ms, 20 ms, or 50 ms, depending on the size of the receptive fields of the convolutional filters or a hop size of the temporal modeling components in the feature extractor 210. The audio features 212 may also have a certain number of channels, each representing a different aspect or attribute of the audio input, such as frequency bands, spectral characteristics, or semantic concepts.

In certain aspects, the gaze estimator 110 includes a concatenator 206, which is configured to concatenate the visual features 204 with the audio features 212 to generate correlated features 214 representing audio-visual correlated features. In certain aspects, the correlated features 214 capture the joint representation and correlation between the visual and audio modalities. The concatenator 206 may perform a channel-wise concatenation, where the visual features 204 and the audio features 212 are stacked along the channel dimension to form a single feature map. The concatenator 206 may also apply additional processing steps, such as normalization, scaling, or attention mechanisms, to ensure that the visual features 204 and the audio features 212 have compatible scales and distributions before concatenation and/or to adaptively weight the contribution of the visual features 204 and the audio features 212 based on their relevance or reliability for gaze estimation. The concatenator 206 may be implemented using various techniques, such as tensor concatenation operations in deep learning frameworks.

In certain aspects, the correlated features 214 may have a spatial and temporal structure that aligns with the visual and audio inputs. For example, if the visual features 204 have a spatial resolution of 16×16 and the audio features 212 have a temporal resolution of 20 ms, the correlated features 214 may have a spatio-temporal resolution of 16×16×20 ms, where each spatio-temporal unit captures the correlation between the visual and audio features at a specific location and time.

The correlated features 214 may also have a certain number of channels, which is the sum of the channels in the visual features 204 and the audio features 212. The channels in the correlated features 214 may represent different aspects or attributes of the joint visual-audio representation, such as object-sound associations, temporal coherence, or semantic consistencies.

In certain aspects, the gaze estimator 110 includes a generator 208, which is configured to generate one or more generated visual features 216 based on the visual features 204 and the audio features 212. In some aspects, the one or more generated visual features 216 may be referred to as audio-guided visual generated, or synthesized, features. In certain aspects, the generator 208 may be implemented using a conditional generative model, such as a conditional generative adversarial network (cGAN) or a conditional variational autoencoder (cVAE).

In examples, the generator 208 takes the visual features 204 and the audio features 212 as input and generates the one or more generated visual features 216 that are consistent with the audio input 106. In certain aspects, the generator 208 is trained to generate plausible visual features based on the audio input 106, leveraging the correlations and dependencies between visual and audio modalities. For example, if the audio input 106 contains speech signals, the generator 208 may generate visual features corresponding to lip movements or facial expressions that are consistent with the speech content. Similarly, if the audio input 106 contains environmental sounds, the generator 208 may generate visual features corresponding to the objects or scenes that typically produce those sounds.

The one or more generated features 216 may have a similar spatial and temporal structure as the visual features 204, but with additional information or details that are obtained, or inferred, from the audio input 106. The one or more generated features 216 may fill in missing or occluded visual regions, disambiguate uncertain or ambiguous visual cues, or provide complementary context that is not directly observable in the visual input.

In certain aspects, the generator 208 may be trained using a combination of adversarial loss and reconstruction loss, where the adversarial loss encourages the generated visual features to be realistic and consistent with the audio input 106, while the reconstruction loss ensures that the one or more generated visual features 216 maintain relevant information from the visual features 204.

In certain aspects, and during training, the generator 208 may be conditioned on various combinations of visual and audio inputs to learn a mapping from the audio space to the visual space. For example, the generator 208 may be trained on pairs of visual features and audio features corresponding to the same time step, or on sequences of visual and audio features spanning multiple time steps. The generator 208 may also be conditioned on additional inputs, such as noise vectors or latent codes, to introduce stochasticity and diversity in the generated visual features.

In certain aspects, the gaze estimator 110 includes a concatenator 218, which is configured to concatenate the one or more generated features 216 with the correlated features 214 to generate features 220, also referred to as audio-visual spatial-temporal features. The concatenator 218 may perform a channel-wise concatenation, where the one or more generated features 216 and the correlated features 214 are stacked along the channel dimension to form a single feature map. The concatenator 218 may also apply additional processing steps, such as normalization, scaling, or attention mechanisms, to adaptively weight the contribution of the one or more generated features 216 and the correlated features 214 based on their relevance or reliability for gaze estimation. For example, the concatenator 218 may assign higher weights to the one or more generated features 216 in regions where the visual input is occluded or ambiguous, and higher weights to the correlated features 214 in regions where the visual and audio inputs are consistent and reliable.

It should be noted that the concatenator 206 and the concatenator 218 can be implemented as separate components or as a single concatenation module. In the case of separate concatenators, the concatenator 206 can be responsible for concatenating the visual features 204 with the audio features 212 to generate the correlated features 214, while the concatenator 218 can be responsible for concatenating the correlated features 214 with the one or more generated features 216 to generate the features 220.

However, in an alternative implementation, the functionality of the concatenator 206 and the concatenator 218 can be combined into a single concatenation module. In this case, the single concatenation module could receive the visual features 204, the audio features 212, and the one or more generated features 216 as inputs, and perform the necessary concatenation operations to generate the features 220 directly. This combined concatenation module can apply the same or different processing steps, such as normalization, scaling, or attention mechanisms, to the input features before concatenation.

In certain aspects, the features 220 may have a similar spatio-temporal structure as the correlated features 214, but with additional channels that represent the information from the one or more generated features 216. In examples, the number of channels in the features 220 may be the sum of the channels in the correlated features 214 and the one or more generated features 216. In certain aspects, the features 220 serve as the final feature representation for gaze estimation, encoding the relevant spatial, temporal, and cross-modal information needed to predict an egocentric gaze of a user. The features 220 may capture various aspects of the visual and audio inputs, such as object locations, motion patterns, saliency cues, speech directions, sound source positions, and their dynamic interactions over time.

In certain aspects, the gaze estimator 110 includes a decoder 224, which is configured to estimate the egocentric gaze 112 based on the features 220. The decoder 224 may be implemented using various techniques, such as fully connected layers, convolutional layers, or attention mechanisms, depending on the desired output format and granularity of the gaze estimate. In examples, the decoder 224 takes the features 220 as input and learns, via machine learning training, to map the features 220 to the corresponding gaze positions or directions. The decoder 224 may be trained using a supervised learning approach, where the ground truth gaze positions or directions are provided as labels during training. The decoder 224 may use various loss functions, such as mean squared error (MSE), cross-entropy, or angular error, to measure the discrepancy between the predicted gaze and the ground truth gaze.

In certain aspects, the gaze estimator 110 may not include the generator 208; accordingly, the gaze estimator 110 may include a decoder 224, which is configured to estimate the egocentric gaze 112 based on the correlated features 214 instead of the features 220. In examples, the decoder 224 takes the correlated features 214 as input and learns, via machine learning training, to map the correlated features 214 to the corresponding gaze positions or directions. The decoder 224 may be trained using a supervised learning approach, where the ground truth gaze positions or directions are provided as labels during training. The decoder 224 may use various loss functions, such as mean squared error (MSE), cross-entropy, or angular error, to measure the discrepancy between the predicted gaze and the ground truth gaze.

In certain aspects, the gaze estimator 110 may not include the concatenator 206; accordingly, the gaze estimator 110 may include a decoder 224, which is configured to estimate the egocentric gaze 112 based on the one or more generated features 216 instead of the features 220. In examples, the decoder 224 takes the one or more generated features 216 as input and learns, via machine learning training, to map the one or more generated features 216 to the corresponding gaze positions or directions. The decoder 224 may be trained using a supervised learning approach, where the ground truth gaze positions or directions are provided as labels during training. The decoder 224 may use various loss functions, such as mean squared error (MSE), cross-entropy, or angular error, to measure the discrepancy between the predicted gaze and the ground truth gaze.

The output of the decoder 224 may be in different formats, depending on the specific requirements of the gaze estimation system. For example, the decoder 224 may output a 2D gaze position in the image plane, a 3D gaze direction in the camera coordinate system, or a probability distribution over a discrete set of gaze targets. The decoder 224 may also output additional information, such as gaze uncertainty, gaze saliency, or gaze dynamics, to provide a more comprehensive and interpretable gaze estimate.

Example Attention Mechanisms

Figure 3:
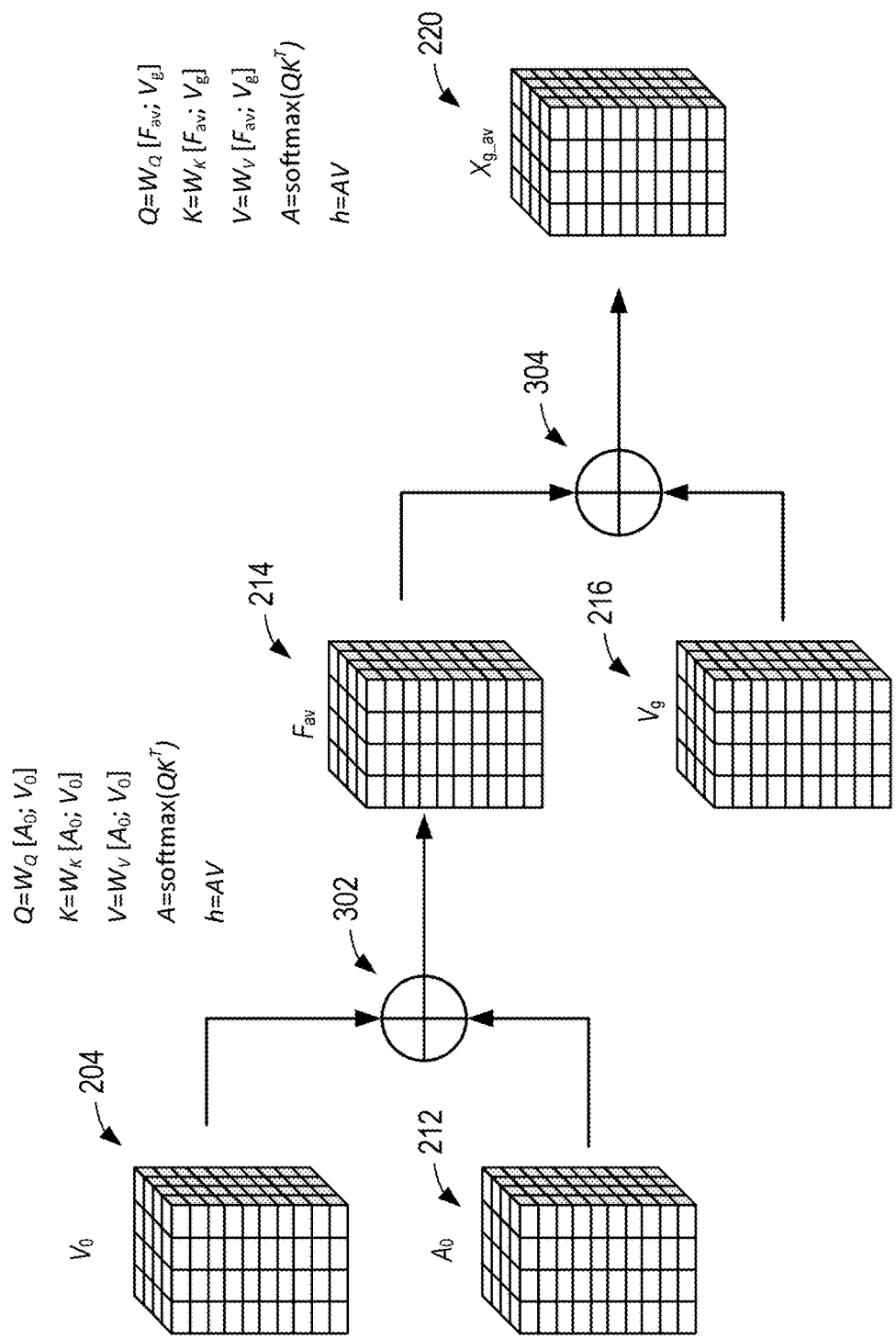
FIG. 3 depicts example attention mechanisms for concatenating visual features and audio features and/or concatenating correlated features with one or more generated features in accordance with at least one example of the present disclosure.

FIG. 3 illustrates example attention mechanisms 302 and/or 304 used in the gaze estimator 110 (FIG. 1 and FIG. 2) for concatenating the visual features 204 and the audio features 212 to generate the correlated features 214, as well as concatenating the correlated features 214 with the one or more generated features 216 to generate the features 220. In examples, the attention mechanisms 302 and/or 304 compute attention weights based on the input features and performs weighted aggregation to obtain the output features.

As previously described in FIG. 2, the visual features 204 reside in a visual latent space and capture the relevant information from the video input 102 (FIG. 1 and FIG. 2) for gaze estimation. As depicted in FIG. 3, the visual features 204 are denoted as $V_O$ and serve as one of the inputs to an attention mechanism 302 (e.g., corresponding to the concatenator 206 (FIG. 2)), where attention is a type of concatenation for generating the correlated features 214. For example, the attention mechanism 302 may be configured to perform cross-attention, or another suitable type of attention.

In certain aspects, the visual features 204 ($V_O$) may be projected using a learned projection matrix $W_Q$ to obtain the query vector (or tensor) Q, a learned projection matrix $W_K$ to obtain the key vector (or tensor) K, and a learned projection matrix $W_V$ to obtain the value vector (or tensor) V. In certain aspects, these projected vectors (or tensors) are used in the attention computation to determine the importance weights and perform feature aggregation.

As described in FIG. 2, the audio features 212 reside in an audio latent space and capture the relevant information from the audio input 106 (FIG. 1 and FIG. 2) for gaze estimation. As depicted in FIG. 3, the audio features 212 are denoted as $A_O$ and serve as another input to the attention mechanism 302 for generating the correlated features 214.

Similar to the visual features 204, the audio features 212 ($A_O$) are projected using the learned projection matrices $W_Q$, $W_K$, and $W_V$ to obtain the corresponding query vector (or tensor) Q, key vector (or tensor) K, and value vector (or tensor) V. These projected vectors (or tensors) are concatenated with the projected vectors (or tensors) from the visual features 204 to form the overall query, key, and value vectors (or tensors) used in an attention computation.

The correlated features 214, denoted as $F_{av}$, are generated by applying the attention mechanism to the concatenated projected vectors (or tensors) from the visual features 204 and the audio features 212. The attention mechanism 302 computes the attention weights based on the similarity between the query vector (or tensor) Q and the key vector (or tensor) K, and then performs a weighted sum of the value vector (or tensor) V using the attention weights. As depicted in FIG. 3, the attention mechanism 302 may be implemented as a scaled dot-product attention, where the attention weights are computed as the softmax of the scaled dot-product between the query vector (or tensor) Q and the key vector (or tensor) K. In certain aspects, the scaling factor is set to the square root of the dimension of the key vector (or tensor) to stabilize the gradient computation. The resulting attention weights are then used to compute the weighted sum of the value vector (or tensor) V, yielding the correlated features 214 ($F_{av}$).

The one or more generated features 216, denoted as $V_g$, may be generated by the generator 208 (FIG. 2) based on the visual features 204 and the audio features 212, as described in FIG. 2. In certain aspects, and as depicted in FIG. 3, the one or more generated features 216 ($V_g$) may be concatenated with the correlated features 214 ($F_{av}$) to form the input to the second attention mechanism 304, where the attention mechanism 304 performs a type of concatenation for generating the features 220, such as cross-attention or other suitable type of attention.

In certain aspects, the concatenated features [$F_{av}$; $V_g$] may be projected using the learned projection matrices $W_Q$, $W_K$, and $W_V$ to obtain the corresponding query vector (or tensor) Q, key vector (or tensor) K, and value vector (or tensor) V. These projected vectors (or tensors) are used in the attention computation of the attention mechanism 304 to determine the importance weights and perform feature aggregation, similar to the process described for generating the correlated features 214.

In certain aspects, the features 220, denoted as $X_{g\_av}$, are generated by applying the attention mechanism 304 to the correlated features 214 ($F_{av}$) and one or more generated features 216 ($V_g$). In examples, the attention mechanism 304 computes the attention weights based on the similarity between the query vector (or tensor) Q and the key vector (or tensor) K, and then performs a weighted sum of the value vector (or tensor) V using the attention weights.

In certain aspects, the attention mechanism 304 is implemented as a scaled dot-product attention, similar to generating the correlated features 214. The resulting attention weights may then be used to compute the weighted sum of the value vector (or tensor) V, yielding the features 220 ($X_{g\_av}$).

In certain aspects, the attention mechanisms 302 and 304 can be extended or modified in various ways to suit specific requirements of the gaze estimation system (e.g., system 100 FIG. 1). For example, the attention mechanism 302 and/or 304 can be implemented as a multi-head attention, where multiple parallel attention heads are used to capture different aspects or representations of the input features. In examples, each attention head computes its own set of attention weights and generates a corresponding output feature vector (or tensor). The output feature vectors (or tensors) from the attention heads may then be concatenated or averaged to obtain the correlated features 214 or the features 220.

Another variation of the attention mechanisms 302 and/or 304 is cross-attention, where the query vector (or tensor) is computed from one set of input features (e.g., visual features 204), while the key and value vectors (or tensors) are computed from another set of input features (e.g., audio features 212). This allows the attention mechanism (e.g., 302 and/or 304) to explicitly model the cross-modal interactions and dependencies between the visual and audio modalities Furthermore, the attention mechanisms 302 and/or 304 can be extended with additional components or techniques, such as position encodings, residual connections, or layer normalization, to enhance the expressiveness and stability of the learned feature representations. In certain aspects, the selected attention mechanism and its variations may depend on the characteristics of the visual and audio inputs, the complexity of the gaze estimation task, and the available computational resources.

Example Gaze Estimator Training Process

Figure 4A:
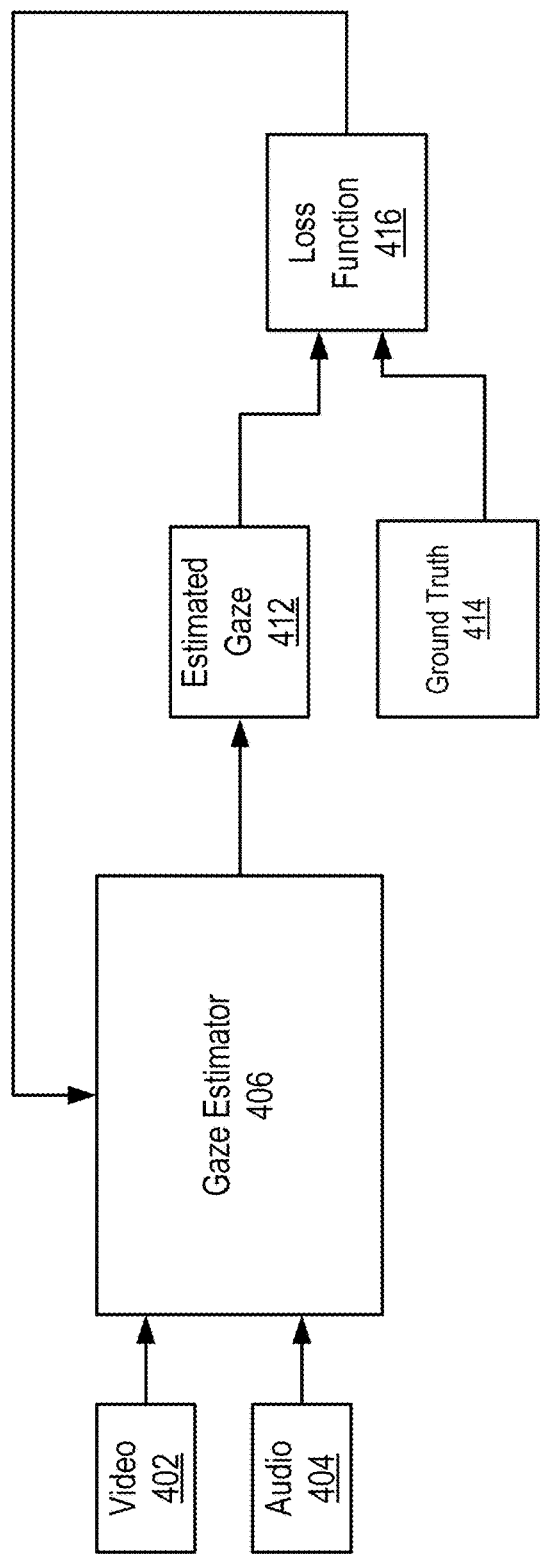
FIG. 4A depicts an example training process for the gaze estimator described in FIGS. 1 and 2 in accordance with examples of the present disclosure

FIG. 4A depicts an example training process 400A for examples of the gaze estimator 110 described in FIGS. 1 and/or 2 in accordance with examples of the present disclosure. In certain aspects, the training process 400A involves providing a video input and an audio input to the gaze estimator, obtaining an estimated gaze output from the gaze estimator, comparing the estimated gaze output with a corresponding ground truth gaze, and updating the parameters of the gaze estimator based on a loss function that measures the discrepancy between the estimated gaze and the ground truth gaze.

In examples, the training process 400A is a procedure for learning the parameters of the gaze estimator 406 using a supervised learning approach. In examples, the gaze estimator 406 may represent an untrained machine-learning model implementation corresponding to the trained machine learning model implementation of the gaze estimator 110 (FIGS. 1 and/or 2). The training process 400A may involve iteratively presenting training samples to the gaze estimator 406, comparing the estimated gaze output 412 with the corresponding ground truth gaze 414, and adjusting the parameters of the gaze estimator 406 to minimize the difference between the estimated gaze output 412 and the ground truth gaze 414. The training samples used in the training process 400A may include video-audio pairs, where each pair includes a video input 402 and a corresponding audio input 404. In certain aspects, the video input 402 captures the visual scene from the perspective of the user, while the audio input 404 captures the sounds in the environment. Thus, the training samples may be collected from real-world scenarios or generated synthetically to cover a wide range of gaze behaviors and audio-visual conditions.

As previously discussed, the gaze estimator 406 may be an instance of the gaze estimator 110 described in the previous figures FIG. 1 and/or FIG. 2. The gaze estimator 406 takes the video input 402 and the audio input 404 as inputs and produces an estimated gaze output 412. The gaze estimator 406 may include the various components and mechanisms described earlier with respect to an example of the gaze estimator 110, such as the feature extractors, the generator, the attention mechanism, and the decoder.

During the training process 400A, the parameters of the gaze estimator 406 may be initialized to random values or pretrained weights. The gaze estimator 406 processes the video input 402 and the audio input 404 and generates an estimated gaze output 412. The estimated gaze output 412 represents the predicted gaze direction or location of the user based on the input video and audio signals. The estimated gaze output 412 can be represented in any format, such as but not limited to, 2D coordinates in the image plane, 3D direction vectors in the camera coordinate system, or probability distributions over a discrete set of gaze targets. In certain aspects, the estimated gaze output 412 is compared with the corresponding ground truth gaze 414 to assess the accuracy and quality of the gaze estimation. The ground truth gaze 414 represents the true or desired gaze direction or location for the given video input 402 and audio input 404 and serves as the target or reference for training the gaze estimator 406. The goal of the training process 400A is to minimize the difference between the estimated gaze output 412 and the ground truth gaze 414.

In certain aspects, the ground truth gaze 414 may be obtained through various means, depending on the specific application and data collection setup. For example, in a controlled laboratory setting, the ground truth gaze 414 can be accurately measured using high-precision eye-tracking devices that record the user's gaze position or direction. In real-world scenarios, the ground truth gaze 414 may be annotated manually by human experts who examine the video input 402 and audio input 404 and provide labels for the gaze targets or regions of interest.

In certain aspects, the loss function 416 is a mathematical function that measures the discrepancy or dissimilarity between the estimated gaze output 412 and the ground truth gaze 414. The loss function 416 quantifies the error or cost associated with the gaze estimation and provides a feedback signal for updating the parameters of the gaze estimator 406 during the training process 400A. There are various types of loss functions that can be used for gaze estimation, depending on the specific formulation of the problem and the desired optimization objective. Examples of loss functions include, but are not limited to: Mean Squared Error (MSE) loss, Cross-entropy loss, and/or angular loss. Mean Squared Error (MSE) loss may be the average squared difference between the estimated gaze coordinates and the ground truth gaze coordinates. MSE loss can be applied in regression tasks where the gaze output is represented as continuous values. Cross-entropy loss measures the dissimilarity between the predicted gaze probability distribution and the ground truth gaze distribution. Cross-entropy loss may be used for classification tasks where the gaze output is represented as a discrete set of gaze targets or classes. Angular loss calculates the angular difference between the estimated gaze direction vector and the ground truth gaze direction vector. Angular loss can be used for gaze estimation tasks where the gaze direction is represented as a unit vector in 3D space.

In certain aspects, the loss function 416 is evaluated during the training process 400A, and its value is used to compute the gradients of the gaze estimator's (e.g., 406) parameters. The gradients are then used to update the parameters using optimization algorithms such as stochastic gradient descent (SGD) or adaptive moment estimation (Adam). In certain aspects, the training process 400A can iterate over multiple training samples, computing the loss function 416 and updating the parameters of the gaze estimator 406 until a desired level of performance or convergence is achieved. The trained gaze estimator 406 (e.g., gaze estimator 110 of FIGS. 1 and/or 2) can then be used for inference on new, unseen video and audio inputs to estimate the gaze direction or location in real-time applications.

Example Generator Training Process

Figure 4B:
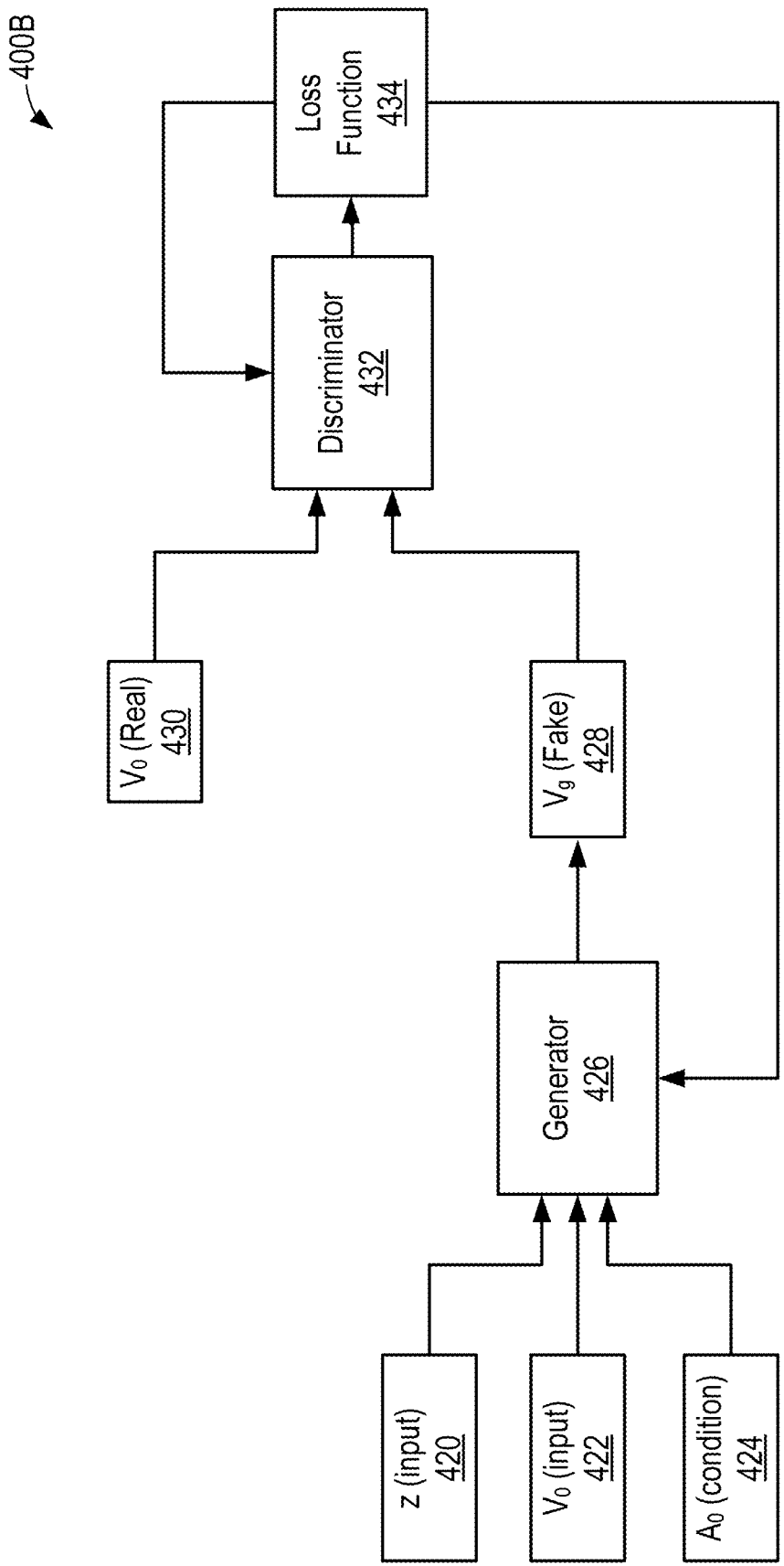
FIG. 4B depicts an example training process for the generator component of the gaze estimator described in FIGS. 1, 2, and 4.

FIG. 4B illustrates an example training process 400B for the generator and discriminator components of examples of the gaze estimator 110 and 406 described in FIGS. 1, 2, and/or 4. The training process 400B involves a conditional generative adversarial network (cGAN) architecture, where the generator 426 learns to generate realistic visual features conditioned on the audio features, and the discriminator 432 learns to distinguish between the generated visual features and the real visual features. The generator 426 and discriminator 432 are trained iteratively using adversarial loss functions to improve the quality and consistency of the generated visual features.

In certain aspects, the training process 400B involves iteratively presenting training samples to the generator 426 and the discriminator 432, computing adversarial loss functions (e.g., loss functions 434), and updating parameters of the generator 426 and the discriminator 432 to optimize their respective objectives. The training samples used in the training process 400B may consist of pairs of real visual features 422 ($V_0$) and corresponding audio features 424 ($A_0$). The real visual features 422 ($V_0$) may be extracted from the video input (e.g., 102 of FIG. 2) using a visual feature extractor (e.g., 202 of FIG. 2), while the audio features 424 ($A_0$) can be extracted from the audio input (e.g., 106 of FIG. 2) using an audio feature extractor (e.g., 210 of FIG. 2). The generator 426 can be trained to learn to generate fake visual features 428 ($V_g$) conditioned on the audio features 424 ($A_0$), while the discriminator 432 can be trained to learn to distinguish between the fake visual features 428 ($V_g$) and the real visual features 430 ($V_0$).

In certain aspects, the input 420 ($z$) can represent a random noise vector (or tensor) that is used as an additional input to the generator 426. The random noise vector 420 ($z$) can be used to introduce stochasticity and diversity in the generated fake visual features 428 ($V_g$). The noise vector 420 ($z$) can be sampled from a predefined probability distribution, such as a Gaussian distribution or a uniform distribution.

As previously described, the fake visual features 428 ($V_g$) are output from the generator 426. The generator 426 takes the random noise vector 420 ($z$), the audio features 424 ($A_0$), and the real visual features 422 ($V_0$) as inputs and generates fake visual features 428 ($V_g$) that resemble the real visual features 422 ($V_0$). The fake visual features 428 ($V_g$) are conditioned on the audio features 424, meaning that they are generated to be consistent with the audio content.

The fake visual features 428 ($V_g$) are fed into the discriminator 432 along with the real visual features 430 ($V_o$). The discriminator 432 is trained to learn to distinguish between the fake visual features 428 ($V_g$) and the real visual features 430 ($V_o$). The generator 426 and the discriminator 432 are trained iteratively, with the generator 426 trying to generate fake visual features 428 ($V_g$) that fool the discriminator 432, and the discriminator 432 trying to correctly identify the fake visual features 428 ($V_g$) and the real visual features 430 ($V_o$). That is, during the training process 400B, the discriminator 432 learns to assign high scores to the real visual features 430 428 ($V_o$) and low scores to the fake visual features 428 428 ($V_g$).

In certain aspects, the loss function 434 is a mathematical function that measures the discrepancy or dissimilarity between the output of the discriminator 432 and the desired labels (real or fake). The loss function 434 quantifies the error or cost associated with the classification of the visual features by the discriminator 432 and provides a feedback signal for updating the parameters of the generator 426 and the discriminator 432 during the training process 400B.

There are various types of loss functions that can be used for training the generator 426 and the discriminator 432, depending on the specific formulation of the problem and the desired optimization objective. Some common examples of loss functions include, but are not limited to: Binary Cross-Entropy (BCE) loss, Least Squares (LS) loss, and Wasserstein loss. BCE loss provides a measure of the dissimilarity between the predicted probability of the visual features being real or fake and the true labels. BCE loss may be common for binary classification tasks. LS loss measures the squared difference between the predicted score of the visual features being real or fake and the true labels. LS loss can be used to stabilize the training and prevent mode collapse. Wasserstein loss measures the Wasserstein distance between the distribution of the real visual features and the distribution of the fake visual features. Wasserstein loss can provide a more stable and meaningful metric for training.

In certain aspects, the selected loss function may depend on the specific requirements and characteristics of the gaze estimation system. The loss function 434 can be evaluated during the training process 400B, and its value can be used to compute the gradients of the generator's and discriminator's parameters. The gradients are then used to update the parameters using one or more optimization algorithms, such as but not limited to stochastic gradient descent (SGD) or adaptive moment estimation (Adam). The training process 400B can iterate over multiple training samples, computing the loss function 434 and updating the parameters of the generator 426 and the discriminator 432 until a desired level of performance or convergence is achieved. The trained generator 426 can then be used to generate realistic visual features conditioned on the audio features, which are further utilized in the gaze estimation system.

In certain aspects, a first loss function used for training the generator 426 and the discriminator 432, comprises a generator loss and a discriminator loss. The generator loss encourages the generator 426 to generate realistic and convincing visual features that are consistent with the input audio features 424. The generator 426 aims to minimize this loss, learning to produce visual features that are indistinguishable from real visual features. On the other hand, the discriminator loss encourages the discriminator 432 to correctly distinguish between real and generated visual features (e.g., 430 and 428 respectively). The discriminator 432 aims to minimize this loss, learning to accurately classify visual features as either real or generated. By jointly optimizing these two losses, the training process 400B trains the generator 426 and discriminator 432 to generate realistic visual features that correspond with the input audio features.

In certain aspects, a second loss function used for training the decoder 224 (FIG. 2), measures the discrepancy between the estimated gaze output 412 and the ground truth gaze 414 labels. The second loss function can be the mean squared error (MSE) loss, which penalizes the squared difference between predicted and true gaze estimations. Another loss function can include a cross-entropy loss, which measures the dissimilarity between the predicted gaze probability distribution and the true gaze distribution. By minimizing this loss function, the decoder 224 (e.g., FIG. 2) is trained to learn to accurately predict an egocentric gaze based on the features 220 (FIG. 2).

In certain aspects, a third loss function used for training the attention mechanisms 302 and/or 304, can be used by the attention mechanisms 302 and/or 304 to learn meaningful and informative attention weights that enhance a gaze estimation. The specific loss function can depend on the type of attention mechanism employed and the desired attention behavior. For example, if a goal is to promote sparsity, the third loss function may include a regularization term that penalizes non-zero attention weights. This may encourage the attention mechanism 302 and/or 304 to focus on one or more key features. Alternatively, if a goal is to promote diversity, the third loss function may include a term that encourages the attention weights to be evenly distributed across different features. This may ensure that the attention mechanism 302 and/or 304 attends to a variety of relevant features. By optimizing the third loss function, the attention mechanism 302 and/or 304 can be trained to learn to adaptively weight the importance of different features for gaze estimation.

In certain aspects, an overall training objective is to minimize a weighted combination of the three loss functions described above. The weights assigned to each loss function can be adjusted to balance the importance of generating realistic visual features, accurately predicting the gaze, and learning informative attention weights. By jointly optimizing these three loss functions, the ML architecture can be trained to learn to perform more accurate egocentric gaze estimations, leveraging both audio and visual inputs effectively.

Example Artificial Intelligence System for Performing Egocentric Gaze Estimation Certain aspects described herein may be implemented, at least in part, using some form of artificial intelligence (AI), e.g., the process of using a machine learning (ML) model to infer or predict output data based on input data. An example ML model may include a mathematical representation of one or more relationships among various objects to provide an output representing one or more predictions or inferences. Once an ML model has been trained, the ML model may be deployed to process data that may be similar to, or associated with, all or part of the training data and provide an output representing one or more predictions or inferences based on the input data.

ML is often characterized in terms of types of learning that generate specific types of learned models that perform specific types of tasks. For example, different types of machine learning include supervised learning, unsupervised learning, semi-supervised learning, and reinforcement learning.

Supervised learning algorithms generally model relationships and dependencies between input features (e.g., a feature vector) and one or more target outputs. Supervised learning uses labeled training data, which are data including one or more inputs and a desired output. Supervised learning may be used to train models to perform tasks like classification, where the goal is to predict discrete values, or regression, where the goal is to predict continuous values. Some example supervised learning algorithms include nearest neighbor, naive Bayes, decision trees, linear regression, support vector machines (SVMs), and artificial neural networks (ANNs).

Unsupervised learning algorithms work on unlabeled input data and train models that take an input and transform it into an output to solve a practical problem. Examples of unsupervised learning tasks are clustering, where the output of the model may be a cluster identification, dimensionality reduction, where the output of the model is an output feature vector that has fewer features than the input feature vector, and outlier detection, where the output of the model is a value indicating how the input is different from a typical example in the dataset. An example unsupervised learning algorithm is k-Means.

Semi-supervised learning algorithms work on datasets containing both labeled and unlabeled examples, where often the quantity of unlabeled examples is much higher than the number of labeled examples. However, the goal of a semi-supervised learning is that of supervised learning. Often, a semi-supervised model includes a model trained to produce pseudo-labels for unlabeled data that is then combined with the labeled data to train a second classifier that leverages the higher quantity of overall training data to improve task performance.

Reinforcement Learning algorithms use observations gathered by an agent from an interaction with an environment to take actions that may maximize a reward or minimize a risk. Reinforcement learning is a continuous and iterative process in which the agent learns from its experiences with the environment until it explores, for example, a full range of possible states. An example type of reinforcement learning algorithm is an adversarial network. Reinforcement learning may be particularly beneficial when used to improve or attempt to optimize a behavior of a model deployed in a dynamically changing environment, such as a wireless communication network.

ML models may be deployed in one or more devices (e.g., network entities such as base station(s) and/or user equipment(s)) to support various wired and/or wireless communication aspects of a communication system. For example, an ML model may be trained to identify patterns and relationships in data corresponding to a network, a device, an air interface, or the like. An ML model may improve operations relating to one or more aspects, such as transceiver circuitry controls, frequency synchronization, timing synchronization, channel state estimation, channel equalization, channel state feedback, modulation, demodulation, device positioning, transceiver tuning, beamforming, signal coding/decoding, network routing, load balancing, and energy conservation (to name just a few) associated with communications devices, services, and/or networks. AI-enhanced transceiver circuitry controls may include, for example, filter tuning, transmit power controls, gain controls (including automatic gain controls), phase controls, power management, gaze estimation, and the like.

Aspects described herein may describe the performance of certain tasks and the technical solution of various technical problems by application of a specific type of ML model, such as an ANN. It should be understood, however, that other type(s) of AI models may be used in addition to or instead of an ANN. An ML model may be an example of an AI model, and any suitable AI model may be used in addition to or instead of any of the ML models described herein. Hence, unless expressly recited, subject matter regarding an ML model is not necessarily intended to be limited to just an ANN solution or machine learning. Further, it should be understood that, unless otherwise specifically stated, terms such "AI model," "ML model," "AI/ML model," "trained ML model," and the like are intended to be interchangeable.

Figure 5:
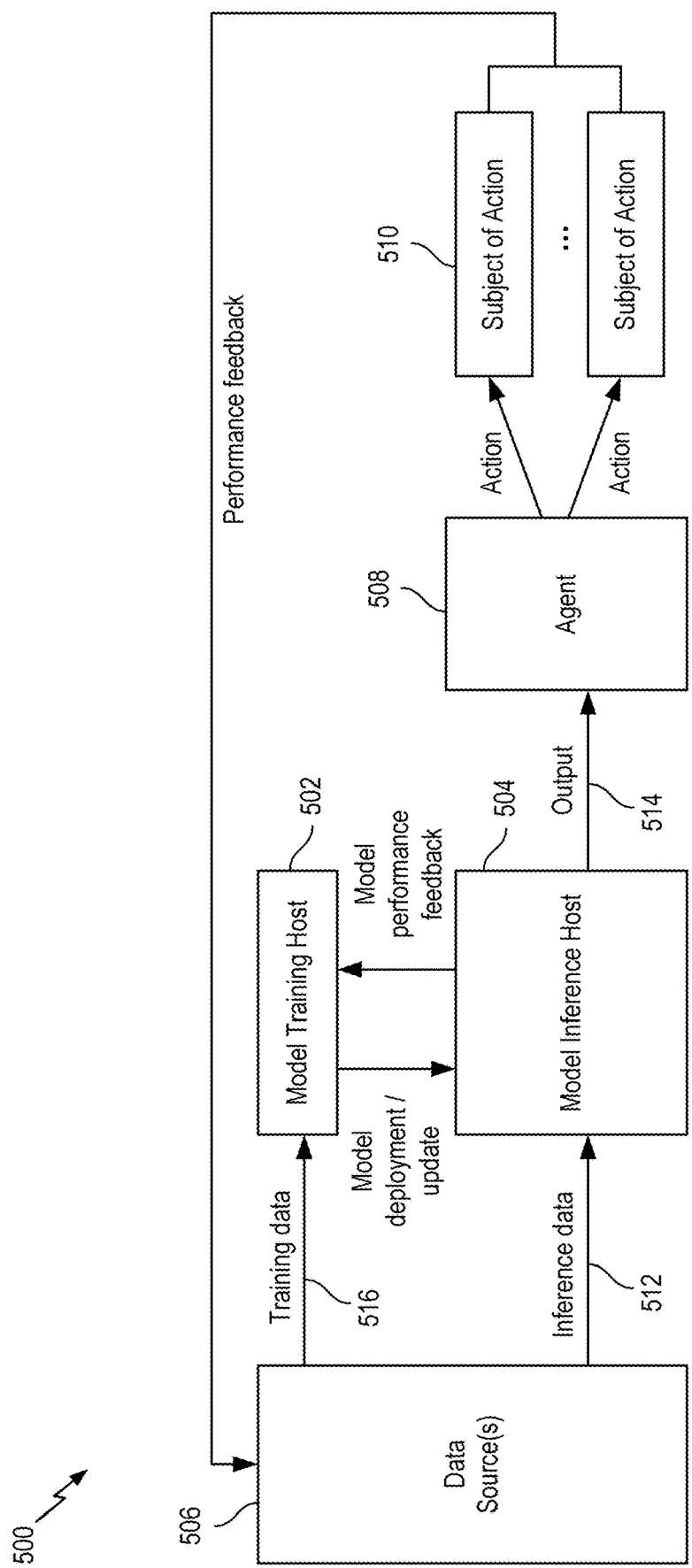
FIG. 5 illustrates an example artificial intelligence (AI) architecture that maybe used in accordance with examples of the present disclosure.

FIG. 5 is a diagram illustrating an example AI architecture 500 that may be used for performing egocentric gaze estimation as described above with respect to FIGS. 1-4B. As illustrated in FIG. 5, the architecture 500 includes multiple logical entities, such as a model training host 502, a model inference host 504, data source(s) 506, and an agent 508. The AI architecture may be used in any of various use cases for wireless communications, such as those listed above.

The model inference host 504, in the architecture 500, is configured to run an ML model based on inference data 512 provided by data source(s) 506. The model inference host 504 may produce an output 514 (e.g., a prediction or inference, such as a discrete or continuous value) based on the inference data 512, that is then provided as input to the agent 508.

The agent 508 may be an element or an entity of a wireless communication system including, for example, a radio access network (RAN), a wireless local area network, a device-to-device (D2D) communications system, etc. As an example, the agent 508 may be a user equipment (UE), a base station or any disaggregated network entity thereof including a centralized unit (CU), a distributed unit (DU), and/or a radio unit (RU)), an access point, a wireless station, a RAN intelligent controller (RIC) in a cloud-based RAN, among some examples. Additionally, the type of agent 508 may also depend on the type of tasks performed by the model inference host 504, the type of inference data 512 provided to model inference host 504, and/or the type of output 514 produced by model inference host 504.

For example, if output 514 from the model inference host 504 is associated with an egocentric gaze estimation, the agent 508 may be user equipment that includes a gaming console GPU, a specialized graphics card, an HMD, or the like. As another example, if output 514 from model inference host 504 is associated with an egocentric gaze estimation, the agent 508 may be an ML engine.

After the agent 508 receives output 514 from the model inference host 504, agent 508 may determine whether to act based on the output. For example, if agent 508 is a gaze estimator and the output 514 from model inference host 504 suggests that a subsequent action based on an estimated gaze location may be warranted, the agent 508 may determine to perform the subsequent action or defer to human operators if a confidence in an output is low. Alternatively, the agent 508 may directly formulate a subsequent action based on the egocentric gaze location estimate.

The data source(s) 506 may be configured for collecting data that is used as training data 516 for training an ML model, or as inference data 512 for feeding an ML model inference operation. In particular, the data source(s) 506 may collect data from any of various entities (e.g., application logs, human transcripts, user feedback, etc.), which may include the subject of action 510, and provide the collected data to a model training host 502 for ML model training. For example, after a subject of action 510 (e.g., performing a safety function) receives an egocentric gaze estimate from an agent 508, the subject of action 510 may provide feedback associated with the egocentric gaze to the data source (s) 506, where the performance feedback may be used by the model training host 502 for monitoring and/or evaluating the ML model performance, such as whether the output 514, provided to agent 508, is accurate. In some examples, if the output 514 provided to agent 508 is inaccurate (or the accuracy is below an accuracy threshold), the model training host 502 may determine to modify or retrain the ML model used by model inference host 504, such as via an ML model deployment/update.

Aspects of the present disclosure provide techniques for estimating an egocentric gaze of a user in an environment using a machine learning (ML) architecture that takes video input and audio input corresponding to the environment. The ML architecture may include a conditional generative adversarial network (GAN), a gaze estimation decoder, and an attention mechanism. During training, the conditional GAN may be trained using a first loss function, the gaze estimation decoder using a second loss function, and the attention mechanism using a third loss function. If the output of the ML architecture is inaccurate compared to ground truth gaze data, the model training host 502 may determine to fine-tune the model parameters or switch to an enhanced architecture via model update. In certain aspects, the model training host 502 may be deployed at a different entity than the model inference host 504 to offload model training processing which can impact performance. In some cases, training and/or inference may be distributed amongst devices in a decentralized or federated fashion.

Figure 6:
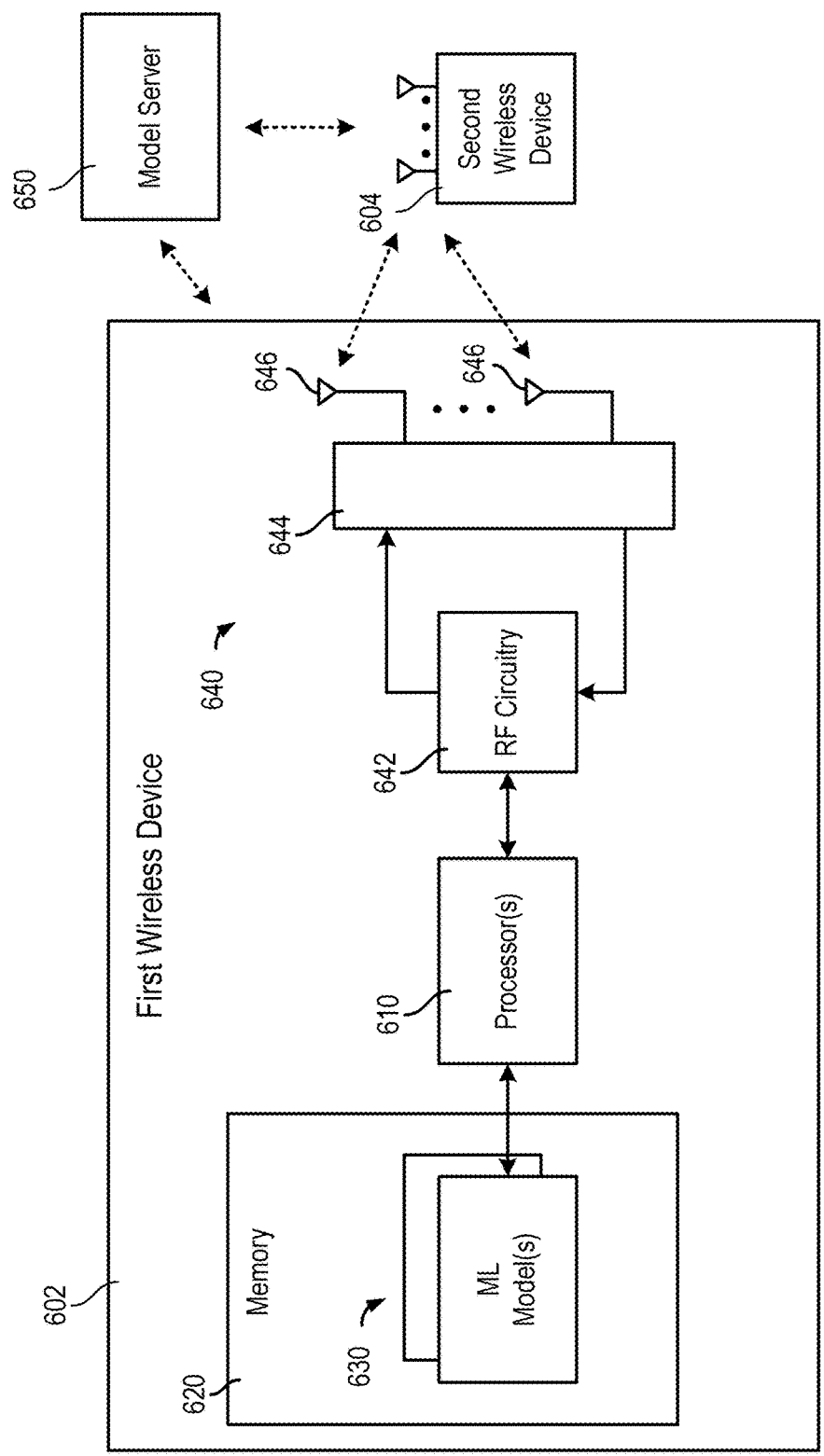
FIG. 6 illustrates an example AI architecture of a first wireless device that is in communication with a second wireless device.

FIG. 6 illustrates an example AI architecture of a first wireless device 602 that is in communication with a second wireless device 604. The first wireless device 602 may be for performing egocentric gaze estimation as described herein with respect to FIGS. 1-5. Similarly, the second wireless device 604 may be for performing egocentric gaze estimation as described herein with respect to FIGS. 1-5. Note that the AI architecture of the first wireless device 602 may be applied to the second wireless device 604.

The first wireless device 602 may be, or may include, a chip, system on chip (SoC), a system in package (SiP), chipset, package or device that includes one or more processors, processing blocks or processing elements (collectively "the processor 610") and one or more memory blocks or elements (collectively "the memory 620").

As an example, in a transmit mode, the processor 610 may transform information (e.g., packets or data blocks) into modulated symbols. As digital baseband signals (e.g., digital in-phase (I) and/or quadrature (Q) baseband signals representative of the respective symbols), the processor 610 may output the modulated symbols to a transceiver 640. The processor 610 may be coupled to the transceiver 640 for transmitting and/or receiving signals via one or more antennas 646. In this example, the transceiver 640 includes radio frequency (RF) circuitry 642, which may be coupled to the antennas 646 via an interface 644. As an example, the interface 644 may include a switch, a duplexer, a diplexer, a multiplexer, and/or the like. The RF circuitry 642 may convert the digital signals to analog baseband signals, for example, using a digital-to-analog converter. The RF circuitry 642 may include any of various circuitry, including, for example, baseband filter(s), mixer(s), frequency synthesizer(s), power amplifier(s), and/or low noise amplifier(s). In some cases, the RF circuitry 642 may upconvert the baseband signals to one or more carrier frequencies for transmission. The antennas 646 may emit RF signals, which may be received at the second wireless device 604.

In receive mode, RF signals received via the antenna 646 (e.g., from the second wireless device 604) may be amplified and converted to a baseband frequency (e.g., downconverter). The received baseband signals may be filtered and converted to digital I or Q signals for digital signal processing. The processor 610 may receive the digital I or Q signals and further process the digital signals, for example, demodulating the digital signals.

One or more ML models 630 may be stored in the memory 620 and accessible to the processor(s) 610. In certain cases, different ML models 630 with different characteristics may be stored in the memory 620, and a particular ML model 630 may be selected based on its characteristics and/or application as well as characteristics and/or conditions of first wireless device 602 (e.g., a power state, a mobility state, a battery reserve, a temperature, etc.). For example, the ML models 630 may have different inference data and output pairings (e.g., different types of inference data produce different types of output), different levels of accuracies (e.g., 80%, 90%, or 95% accurate) associated with the predictions (e.g., the output 514 of FIG. 5), different latencies (e.g., processing times of less than 10 ms, 100 ms, or 1 second) associated with producing the predictions, different ML model sizes (e.g., file sizes), different coefficients or weights, etc.

The processor 610 may use the ML model 630 to produce output data (e.g., the output 514 of FIG. 5) based on input data (e.g., the inference data 512 of FIG. 5), for example, as described herein with respect to the inference host 504 of FIG. 5. The ML model 630 may be used to perform any of various AI-enhanced tasks, such as those listed above.

As an example, the ML model 630 may perform egocentric gaze estimation. The input data may include, for example, video input and audio input, etc. The output data may include, for example, an egocentric gaze estimate as previously described. Note that other input data and/or output data may be used in addition to or instead of the examples described herein. Note that other input data and/or output data may be used in addition to or instead of the examples described herein.

In certain aspects, a model server 650 may perform any of various ML model lifecycle management (LCM) tasks for the first wireless device 602 and/or the second wireless device 604. The model server 650 may operate as the model training host 502 of FIG. 5 and update the ML model 630 using training data. In some cases, the model server 650 may operate as the data source(s) 506 of FIG. 5 to collect and host training data, inference data, and/or performance feedback associated with an ML model 630. In certain aspects, the model server 650 may host various types and/or versions of the ML models 630 for the first wireless device 602 and/or the second wireless device 604 to download.

In some cases, the model server 650 may monitor and evaluate the performance of the ML model 630 to trigger one or more LCM tasks. For example, the model server 650 may determine whether to activate or deactivate the use of a particular ML model at the first wireless device 602 and/or the second wireless device 604, and the model server 650 may provide such an instruction to the respective first wireless device 602 and/or the second wireless device 604. In some cases, the model server 650 may determine whether to switch to a different ML model 630 being used at the first wireless device 602 and/or the second wireless device 604, and the model server 650 may provide such an instruction to the respective first wireless device 602 and/or the second wireless device 604. In yet further examples, the model server 650 may also act as a central server for decentralized machine learning tasks, such as federated learning.

Example Artificial Intelligence Model

Figure 7:
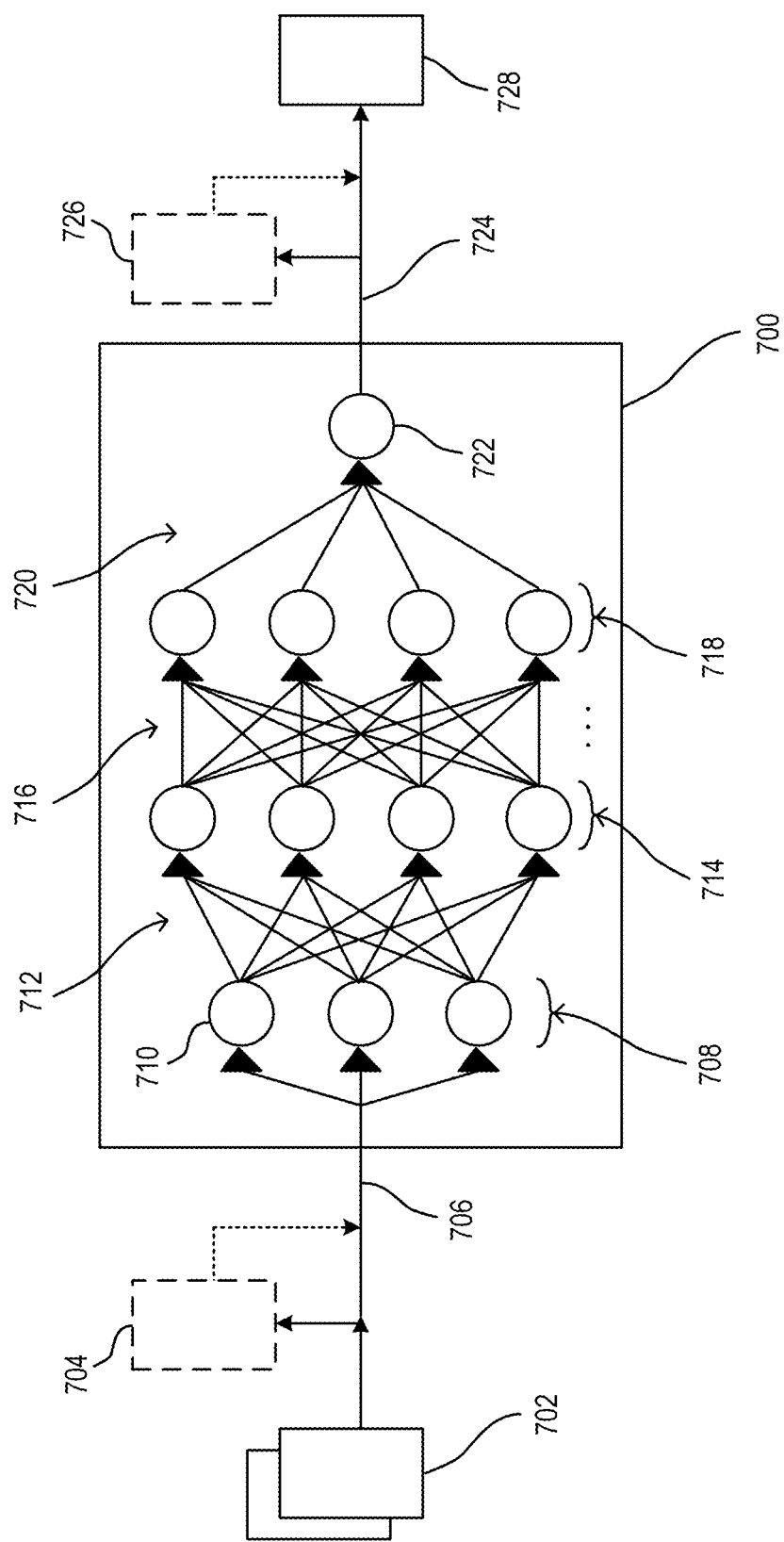
FIG. 7 illustrates an example artificial neural network in accordance with examples of the present disclosure.

FIG. 7 is an illustrative block diagram of an example artificial neural network (ANN) 700.

ANN 700 may receive input data 706 which may include one or more bits of data 702, pre-processed data output from pre-processor 704 (optional), or some combination thereof. Here, data 702 may include training data, verification data, application-related data, or the like, e.g., depending on the stage of development and/or deployment of ANN 700. Pre-processor 704 may be included within ANN 700 in some other implementations. Pre-processor 704 may, for example, process all or a portion of data 702 which may result in some of data 702 being changed, replaced, deleted, etc. In some implementations, pre-processor 704 may add additional data to data 702.

ANN 700 includes at least one first layer 708 of artificial neurons 710 (e.g., perceptrons) to process input data 706 and provide resulting first layer output data via edges 712 to at least a portion of at least one second layer 714. Second layer 714 processes data received via edges 712 and provides second layer output data via edges 716 to at least a portion of at least one third layer 718. Third layer 718 processes data received via edges 716 and provides third layer output data via edges 720 to at least a portion of a final layer 722 including one or more neurons to provide output data 724. All or part of output data 724 may be further processed in some manner by (optional) post-processor 726. Thus, in certain examples, ANN 700 may provide output data 728 that is based on output data 724, post-processed data output from post-processor 726, or some combination thereof. Post-processor 726 may be included within ANN 700 in some other implementations. Post-processor 726 may, for example, process all or a portion of output data 724 which may result in output data 728 being different, at least in part, to output data 724, e.g., as result of data being changed, replaced, deleted, etc. In some implementations, post-processor 726 may be configured to add additional data to output data 724. In this example, second layer 714 and third layer 718 represent intermediate or hidden layers that may be arranged in a hierarchical or other like structure. Although not explicitly shown, there may be one or more further intermediate layers between the second layer 714 and the third layer 718.

The structure and training of artificial neurons 710 in the various layers may be tailored to specific requirements of an application. Within a given layer of an ANN, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" artificial neurons of a next layer. Artificial neurons in such a layer may be activated by or be responsive to weights and biases that may be adjusted during a training process. Weights of the various artificial neurons may act as parameters to control a strength of connections between layers or artificial neurons, while biases may act as parameters to control a direction of connections between the layers or artificial neurons. An activation function may select or determine whether an artificial neuron transmits its output to the next layer or not in response to its received data.

Different activation functions may be used to model different types of non-linear relationships. By introducing non-linearity into an ML model, an activation function allows the ML model to "learn" complex patterns and relationships in the input data (e.g., 506 in FIG. 5). Some non-exhaustive example activation functions include a linear function, binary step function, sigmoid, hyperbolic tangent (tanh), a rectified linear unit (ReLU) and variants, exponential linear unit (ELU), Swish, Softmax, and others.

Design tools (such as computer applications, programs, etc.) may be used to select appropriate structures for ANN 700 and a number of layers and a number of artificial neurons in each layer, as well as selecting activation functions, a loss function, training processes, etc. Once an initial model has been designed, training of the model may be conducted using training data. Training data may include one or more datasets within which ANN 700 may detect, determine, identify or ascertain patterns. Training data may represent various types of information, including written, visual, audio, environmental context, operational properties, etc. During training, parameters of artificial neurons 710 may be changed, such as to minimize or otherwise reduce a loss function or a cost function. A training process may be repeated multiple times to fine-tune ANN 700 with each iteration.

Various ANN model structures are available for consideration. For example, in a feedforward ANN structure each artificial neuron 710 in a layer receives information from the previous layer and likewise produces information for the next layer. In a convolutional ANN structure, some layers may be organized into filters that extract features from data (e.g., training data and/or input data). In a recurrent ANN structure, some layers may have connections that allow for processing of data across time, such as for processing information having a temporal structure, such as time series data forecasting.

In an autoencoder ANN structure, compact representations of data may be processed and the model trained to predict or potentially reconstruct original data from a reduced set of features. An autoencoder ANN structure may be useful for tasks related to dimensionality reduction and data compression.

A generative adversarial ANN structure may include a generator ANN and a discriminator ANN that are trained to compete with each other. Generative-adversarial networks (GANs) are ANN structures that may be useful for tasks relating to generating synthetic data or improving the performance of other models.

A transformer ANN structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute, calculate, determine or select weighted sums of input features based on a similarity between different elements of the input sequence. A transformer ANN structure may include a series of feedforward ANN layers that may learn non-linear relationships between the input and output sequences. The output of a transformer ANN structure may be obtained by applying a linear transformation to the output of a final attention layer. A transformer ANN structure may be of particular use for tasks that involve sequence modeling, or other like processing.

Another example type of ANN structure, is a model with one or more invertible layers. Models of this type may be inverted or "unwrapped" to reveal the input data that was used to generate the output of a layer.

Other example types of ANN model structures include fully connected neural networks (FCNNs) and long short-term memory (LSTM) networks.

ANN 700 or other ML models may be implemented in various types of processing circuits along with memory and applicable instructions therein, for example, as described herein with respect to FIGS. 6 and 7. For example, general-purpose hardware circuits, such as, such as one or more central processing units (CPUs) and one or more graphics processing units (GPUs) may be employed to implement a model. One or more ML accelerators, such as tensor processing units (TPUs), embedded neural processing units (eNPUs), or other special-purpose processors, and/or field-programmable gate arrays (FPGAs), application-specific integrated circuits (ASICs), or the like also may be employed. Various programming tools are available for developing ANN models.

Aspects of Artificial Intelligence Model Training

There are a variety of model training techniques and processes that may be used prior to, or at some point following, deployment of an ML model, such as ANN 700 of FIG. 7.

As part of a model development process, information in the form of applicable training data may be gathered or otherwise created for use in training an ML model accordingly. For example, training data may be gathered or otherwise created regarding information associated with received/transmitted signal strengths, interference, and resource usage data, as well as any other relevant data that might be useful for training a model to address one or more problems or issues in a communication system. In certain instances, all or part of the training data may originate in one or more user equipments (UEs), one or more network entities, or one or more other devices in a wireless communication system. In some cases, all or part of the training data may be aggregated from multiple sources (e.g., one or more UEs, one or more network entities, the Internet, etc.). For example, wireless network architectures, such as self-organizing networks (SONs) or mobile drive test (MDT) networks, may be adapted to support collection of data for ML model applications. In another example, training data may be generated or collected online, offline, or both online and offline by a UE, network entity, or other device(s), and all or part of such training data may be transferred or shared (in real or near-real time), such as through store and forward functions or the like. Offline training may refer to creating and using a static training dataset, e.g., in a batched manner, whereas online training may refer to a real-time or near-real-time collection and use of training data. For example, an ML model at a network device (e.g., a UE) may be trained and/or fine-tuned using online or offline training. For offline training, data collection and training can occur in an offline manner at the network side (e.g., at a base station or other network entity) or at the UE side. For online training, the training of a UE-side ML model may be performed locally at the UE or by a server device (e.g., a server hosted by a UE vendor) in a real-time or near-real-time manner based on data provided to the server device from the UE.

In certain instances, all or part of the training data may be shared within a wireless communication system, or even shared (or obtained from) outside of the wireless communication system.

Once an ML model has been trained with training data, its performance may be evaluated. In some scenarios, evaluation/verification tests may use a validation dataset, which may include data not in the training data, to compare the model's performance to baseline or other benchmark information. If model performance is deemed unsatisfactory, it may be beneficial to fine-tune the model, e.g., by changing its architecture, re-training it on the data, or using different optimization techniques, etc. Once a model's performance is deemed satisfactory, the model may be deployed accordingly. In certain instances, a model may be updated in some manner, e.g., all or part of the model may be changed or replaced, or undergo further training, just to name a few examples.

As part of a training process for an ANN, such as ANN 700 of FIG. 7, parameters affecting the functioning of the artificial neurons and layers may be adjusted. For example, backpropagation techniques may be used to train the ANN by iteratively adjusting weights and/or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

Backpropagation techniques associated with a loss function may measure how well a model is able to predict a desired output for a given input. An optimization algorithm may be used during a training process to adjust weights and/or biases to reduce or minimize the loss function which should improve the performance of the model. There are a variety of optimization algorithms that may be used along with backpropagation techniques or other training techniques. Some initial examples include a gradient descent based optimization algorithm and a stochastic gradient descent based optimization algorithm. A stochastic gradient descent (or ascent) technique may be used to adjust weights/biases in order to minimize or otherwise reduce a loss function. A mini-batch gradient descent technique, which is a variant of gradient descent, may involve updating weights/biases using a small batch of training data rather than the entire dataset. A momentum technique may accelerate an optimization process by adding a momentum term to update or otherwise affect certain weights/biases.

An adaptive learning rate technique may adjust a learning rate of an optimization algorithm associated with one or more characteristics of the training data. A batch normalization technique may be used to normalize inputs to a model in order to stabilize a training process and potentially improve the performance of the model.

A "dropout" technique may be used to randomly drop out some of the artificial neurons from a model during a training process, e.g., in order to reduce overfitting and potentially improve the generalization of the model.

An "early stopping" technique may be used to stop an on-going training process early, such as when a performance of the model using a validation dataset starts to degrade.

Another example technique includes data augmentation to generate additional training data by applying transformations to all or part of the training information.

A transfer learning technique may be used which involves using a pre-trained model as a starting point for training a new model, which may be useful when training data is limited or when there are multiple tasks that are related to each other.

A multi-task learning technique may be used which involves training a model to perform multiple tasks simultaneously to potentially improve the performance of the model on one or more of the tasks. Hyperparameters or the like may be input and applied during a training process in certain instances.

Another example technique that may be useful with regard to an ML model is some form of a "pruning" technique. A pruning technique, which may be performed during a training process or after a model has been trained, involves the removal of unnecessary (e.g., because they have no impact on the output) or less necessary (e.g., because they have negligible impact on the output), or possibly redundant features from a model. In certain instances, a pruning technique may reduce the complexity of a model or improve efficiency of a model without undermining the intended performance of the model.

Pruning techniques may be particularly useful in the context of wireless communication, where the available resources (such as power and bandwidth) may be limited. Some example pruning techniques include a weight pruning technique, a neuron pruning technique, a layer pruning technique, a structural pruning technique, and a dynamic pruning technique. Pruning techniques may, for example, reduce the amount of data corresponding to a model that may need to be transmitted or stored.

Weight pruning techniques may involve removing some of the weights from a model. Neuron pruning techniques may involve removing some neurons from a model. Layer pruning techniques may involve removing some layers from a model. Structural pruning techniques may involve removing some connections between neurons in a model. Dynamic pruning techniques may involve adapting a pruning strategy of a model associated with one or more characteristics of the data or the environment. For example, in certain wireless communication devices, a dynamic pruning technique may more aggressively prune a model for use in a low-power or low-bandwidth environment, and less aggressively prune the model for use in a high-power or high-bandwidth environment. In certain aspects, pruning techniques also may be applied to training data, e.g., to remove outliers, etc. In some implementations, pre-processing techniques directed to all or part of a training dataset may improve model performance or promote faster convergence of a model. For example, training data may be pre-processed to change or remove unnecessary data, extraneous data, incorrect data, or otherwise identifiable data. Such pre-processed training data may, for example, lead to a reduction in potential overfitting, or otherwise improve the performance of the trained model.

One or more of the example training techniques presented above may be employed as part of a training process. As above, some example training processes that may be used to train an ML model include supervised learning, unsupervised learning, semi-supervised learning, and reinforcement learning technique.

Decentralized, distributed, or shared learning, such as federated learning, may enable training on data distributed across multiple devices or organizations, without the need to centralize data or the training. Federated learning may be particularly useful in scenarios where data is sensitive or subject to privacy constraints, or where it is impractical, inefficient, or expensive to centralize data. In the context of wireless communication, for example, federated learning may be used to improve performance by allowing an ML model to be trained on data collected from a wide range of devices and environments. For example, an ML model may be trained on data collected from a large number of wireless devices in a network, such as distributed wireless communication nodes, smartphones, or internet-of-things (IoT) devices, to improve the network's performance and efficiency. With federated learning, a user equipment (UE) or other device may receive a copy of all or part of a model and perform local training on such copy of all or part of the model using locally available training data. Such a device may provide update information (e.g., trainable parameter gradients) regarding the locally trained model to one or more other devices (such as a network entity or a server) where the updates from other-like devices (such as other UEs) may be aggregated and used to provide an update to a shared model or the like. A federated learning process may be repeated iteratively until all or part of a model obtains a satisfactory level of performance. Federated learning may enable devices to protect the privacy and security of local data, while supporting collaboration regarding training and updating of all or part of a shared model.

In some implementations, one or more devices or services may support processes relating to a ML model's usage, maintenance, activation, reporting, or the like. In certain instances, all or part of a dataset or model may be shared across multiple devices, e.g., to provide or otherwise augment or improve processing. In some examples, signaling mechanisms may be utilized at various nodes of wireless network to signal the capabilities for performing specific functions related to ML model, support for specific ML models, capabilities for gathering, creating, transmitting training data, or other ML related capabilities. ML models performing self-attention, for example, may be employed to support decisions relating to resource allocation or selection, image analysis and reconstruction, classification, error identification and mitigation, etc.

Example Method for Performing Egocentric Gaze Estimation

Figure 8:
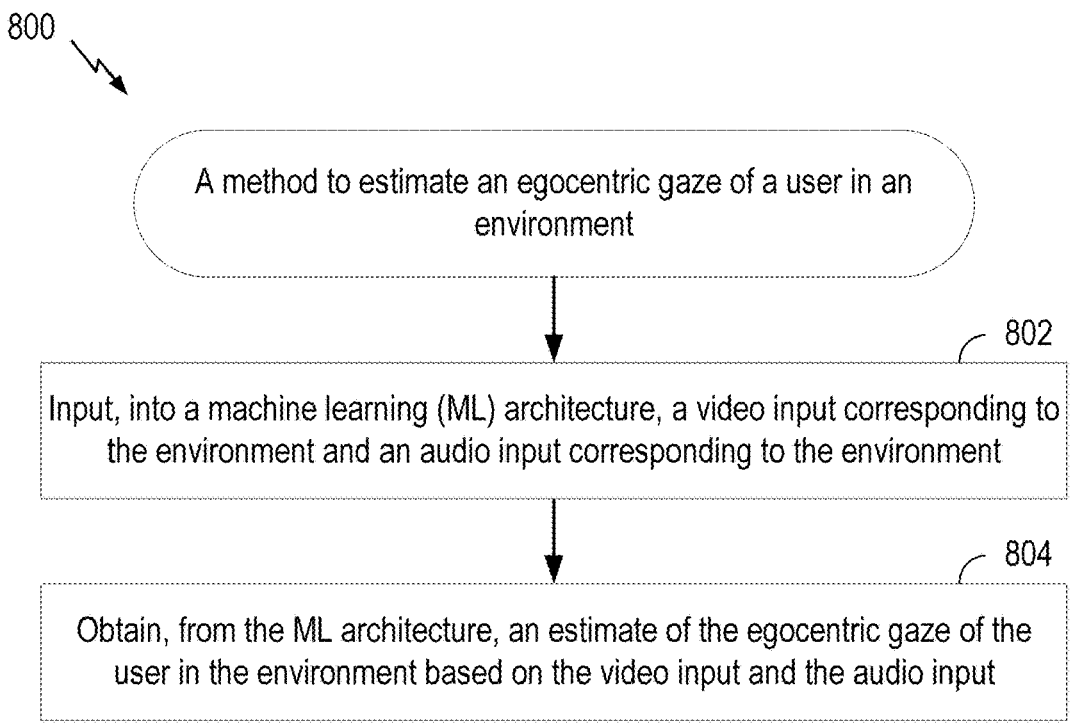
FIG. 8 depicts an example method for performing egocentric gaze estimation in accordance with examples of the present disclosure.

FIG. 8 shows a method 800 directed to performing egocentric gaze estimation. In one aspect, method 800, or any aspect related to it, may be performed by an apparatus, such as processing system 900 of FIG. 9, which includes various components operable, configured, or adapted to perform the method 800.

Method 800 begins at 802 with inputting, into a machine learning (ML) architecture, video input corresponding to an environment and audio input corresponding to the environment.

Method 800 ends at 804 with obtaining, from the ML architecture, an estimate of the egocentric gaze of the user in the environment based on the video input and the audio input.

In some embodiments of method 800, the audio input comprises a plurality of audio channels.

In some embodiments of method 800, the video input comprises one or more visual features; and the audio input comprises one or more audio features.

In some embodiments of method 800, the video input comprises one or more video frames; the audio input comprises one or more audio channels; and obtaining the estimate comprises: extracting one or more visual features from the video input; and extracting one or more audio features from the audio input.

In some embodiments of method 800, obtaining the estimate comprises concatenating one or more visual features with one or more audio features to generate audio-visual correlated features, the one or more visual features corresponding to the video input, and the one or more audio features corresponding to the audio input, wherein the estimate is based on the audio-visual correlated features.

In some embodiments of method 800, concatenating the one or more visual features with the one or more audio features comprises concatenating the one or more visual features with the one or more audio features using an attention mechanism of the ML architecture.

In some embodiments of method 800, the attention mechanism comprises at least one of a self-attention mechanism, a cross-attention mechanism, a single-head attention mechanism, or a multi-head attention mechanism.

In some embodiments of method 800, obtaining the estimate comprises inputting the audio-visual correlated features into a gaze estimation decoder configured to output the estimate based on the audio-visual correlated features.

In some embodiments of method 800, obtaining the estimate comprises generating one or more generated visual features based on one or more visual features and one or more audio features, the one or more visual features corresponding to the video input, and the one or more audio features corresponding to the audio input, wherein the estimate is based on the one or more generated visual features.

In some embodiments of method 800, generating the one or more generated visual features comprises generating the one or more generated visual features using a conditional generative adversarial network (GAN) of the ML architecture with the one or more visual features and the one or more audio features as input to the conditional GAN.

In some embodiments of method 800, obtaining the estimate comprises inputting the one or more generated visual features into a gaze estimation decoder configured to output the estimate based on the one or more generated visual features.

In some embodiments of method 800, obtaining the estimate comprises concatenating one or more visual features with one or more audio features to generate audio-visual correlated features, the one or more visual features corresponding to the video input, and the one or more audio features corresponding to the audio input; and generating one or more generated visual features based on the one or more visual features and the one or more audio features, wherein the estimate is based on the one or more generated visual features and the audio-visual correlated features.

In some embodiments of method 800, generating the one or more generated visual features comprises generating the one or more generated visual features using a conditional generative adversarial network (GAN) of the ML architecture with the one or more visual features and the one or more audio features as input to the conditional GAN.

In some embodiments of method 800, obtaining the estimate comprises concatenating the one or more generated visual features with the audio-visual correlated features to generate audio-visual spatial-temporal features, wherein the estimate is based on the audio-visual spatial-temporal features.

In some embodiments of method 800, concatenating the one or more generated visual features with the audio-visual correlated features comprises concatenating the one or more generated visual features with the audio-visual correlated features using an attention mechanism of the ML architecture.

In some embodiments of method 800, obtaining the estimate comprises inputting the audio-visual spatial-temporal features into a gaze estimation decoder configured to output the estimate based on the audio-visual spatial-temporal features.

In some embodiments of method 800, the estimate comprises a gaze predicted two-dimensional (2D) heatmap that indicates a probability distribution of the egocentric gaze within a video frame.

In some embodiments of method 800, the ML architecture comprises a conditional generative adversarial network (GAN), a gaze estimation decoder, and an attention mechanism; and the method further comprises: training the conditional GAN using a first loss function; training the gaze estimation decoder using a second loss function; and training the attention mechanism using a third loss function.

In some embodiments of method 800, training the gaze estimation decoder comprises training the gaze estimation decoder on a training dataset comprising egocentric video frames, audio signals, and ground truth gaze labels.

Note that FIG. 8 is just one example of a method, and other methods including fewer, additional, or alternative steps are possible consistent with this disclosure.

Example Processing System for Performing Egocentric Gaze Estimation

Figure 9:
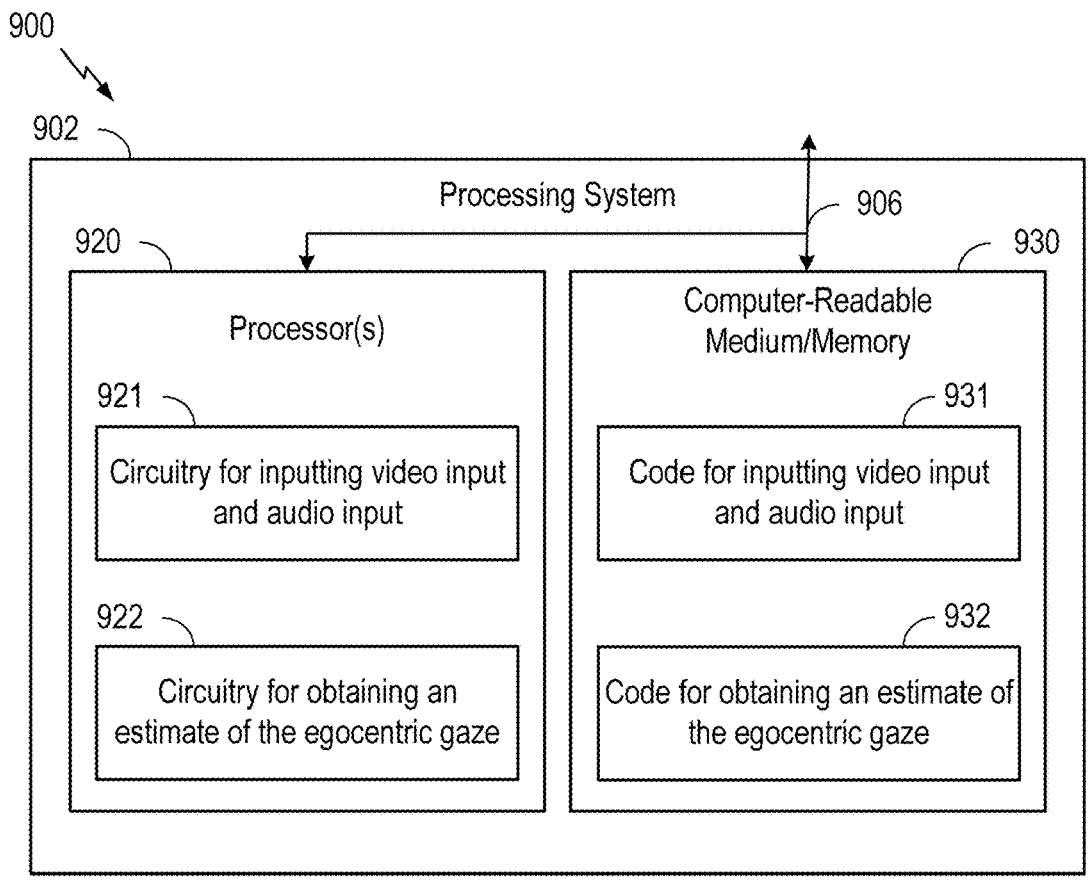
FIG. 9 depicts aspects of an example device in accordance with examples of the present disclosure.

FIG. 9 depicts aspects of an example processing system 900.

The processing system 900 includes a processing system 902 includes one or more processors 920. The one or more processors 920 are coupled to a computer-readable medium/memory 930 via a bus 906. In certain aspects, the computer-readable medium/memory 930 is configured to store instructions (e.g., computer-executable code) that when executed by the one or more processors 920, cause the one or more processors 920 to perform the method 800 described with respect to FIG. 8, or any aspect related to it, including any additional steps or sub-steps described in relation to FIG. 8.

In the depicted example, computer-readable medium/memory 930 stores code (e.g., executable instructions) for inputting video input and audio input 931 and code for obtaining an estimate of the egocentric gaze 932. Processing of the code 931-932 may enable and cause the processing system 900 to perform the method 800 described with respect to FIG. 8, or any aspect related to it.

The one or more processors 920 include circuitry configured to implement (e.g., execute) the code stored in the computer-readable medium/memory 930, including circuitry for inputting video input and audio input 921 and code for obtaining an estimate of the egocentric gaze 922. Processing with circuitry 921-922 may enable and cause the processing system 900 to perform the method 800 described with respect to FIG. 8, or any aspect related to it.

Example Clauses

Implementation examples are described in the following numbered clauses:

Clause 1: A method for estimating an egocentric gaze of a user in an environment, comprising: inputting, into a machine learning (ML) architecture, a video input corresponding to the environment and the audio input corresponding to the environment; and obtaining, from the ML architecture, an estimate of the egocentric gaze of the user in the environment based on the video input and the audio input.

Clause 2: A method in accordance with Clause 1, wherein the audio input comprises a plurality of audio channels.

Clause 3: A method in accordance with any one of Clauses 1-2, wherein the video input comprises one or more visual features; and the audio input comprises one or more audio features.

Clause 4: A method in accordance with any one of Clauses 1-3, wherein the video input comprises one or more video frames; the audio input comprises one or more audio channels; and obtaining the estimate comprises extracting one or more visual features from the video input; and extracting one or more audio features from the audio input.

Clause 5: A method in accordance with any one of Clauses 1-4, wherein obtaining the estimate comprises concatenating one or more visual features with one or more audio features to generate audio-visual correlated features, the one or more visual features corresponding to the video input, and the one or more audio features corresponding to the audio input, wherein the estimate is based on the audio-visual correlated features.

Clause 6: A method in accordance with Clause 5, wherein concatenating the one or more visual features with the one or more audio features comprises concatenating the one or more visual features with the one or more audio features using an attention mechanism of the ML architecture.

Clause 7: A method in accordance with Clause 6, wherein the attention mechanism comprises at least one of a self-attention mechanism, a cross-attention mechanism, a single-head attention mechanism, or a multi-head attention mechanism.

Clause 8: A method in accordance with Clause 5, wherein obtaining the estimate comprises inputting the audio-visual correlated features into a gaze estimation decoder configured to output the estimate based on the audio-visual correlated features.

Clause 9: A method in accordance with Clause 1, wherein obtaining the estimate comprises generating one or more generated visual features based on one or more visual features and one or more audio features, the one or more visual features corresponding to the video input, and the one or more audio features corresponding to the audio input, wherein the estimate is based on the one or more generated visual features.

Clause 10: A method in accordance with Clause 9, wherein generating the one or more generated visual features comprises generating the one or more generated visual features using a conditional generative adversarial network (GAN) of the ML architecture with the one or more visual features and the one or more audio features as input to the conditional GAN.

Clause 11: A method in accordance with Clause 9, wherein obtaining the estimate comprises inputting the one or more generated visual features into a gaze estimation decoder configured to output the estimate based on the one or more generated visual features.

Clause 12: A method in accordance with Clause 1, wherein obtaining the estimate comprises concatenating one or more visual features with one or more audio features to generate audio-visual correlated features, the one or more visual features corresponding to the video input, and the one or more audio features corresponding to the audio input; and generating one or more generated visual features based on the one or more visual features and the one or more audio features, wherein the estimate is based on the one or more generated visual features and the audio-visual correlated features.

Clause 13: A method in accordance with Clause 12, wherein generating the one or more generated visual features comprises generating the one or more generated visual features using a conditional generative adversarial network (GAN) of the ML architecture with the one or more visual features and the one or more audio features as input to the conditional GAN.

Clause 14: A method in accordance with Clause 12, wherein obtaining the estimate comprises concatenating the one or more generated visual features with the audio-visual correlated features to generate audio-visual spatial-temporal features, wherein the estimate is based on the audio-visual spatial-temporal features.

Clause 15: A method in accordance with Clause 14, wherein concatenating the one or more generated visual features with the audio-visual correlated features comprises concatenating the one or more generated visual features with the audio-visual correlated features using an attention mechanism of the ML architecture.

Clause 16: A method in accordance with Clause 14, wherein obtaining the estimate comprises inputting the audio-visual spatial-temporal features into a gaze estimation decoder configured to output the estimate based on the audio-visual spatial-temporal features.

Clause 17: A method in accordance with any one of Clauses 1-16, wherein the estimate comprises a gaze predicted two-dimensional (2D) heatmap that indicates a probability distribution of the egocentric gaze within a video frame.

Clause 18: A method in accordance with any one of Clauses 1-17, wherein the ML architecture comprises a conditional generative adversarial network (GAN), a gaze estimation decoder, and an attention mechanism; and the method further comprises training the conditional GAN using a first loss function; training the gaze estimation decoder using a second loss function; and training the attention mechanism using a third loss function.

Clause 19: A method in accordance with Clause 18, wherein training the gaze estimation decoder comprises training the gaze estimation decoder on a training dataset comprising egocentric video frames, audio signals, and ground truth gaze labels.

Clause 20: One or more apparatuses, comprising: one or more memories comprising executable instructions; and one or more processors configured to execute the executable instructions and cause the one or more apparatuses to perform a method in accordance with any one of clauses 1-19.

Clause 21: One or more apparatuses, comprising: one or more memories; and one or more processors, coupled to the one or more memories, configured to cause the one or more apparatuses to perform a method in accordance with any one of Clauses 1-19.

Clause 22: One or more apparatuses, comprising: one or more memories; and one or more processors, coupled to the one or more memories, configured to perform a method in accordance with any one of Clauses 1-19.

Clause 23: One or more apparatuses, comprising means for performing a method in accordance with any one of Clauses 1-19.

Clause 24: One or more non-transitory computer-readable media comprising executable instructions that, when executed by one or more processors of one or more apparatuses, cause the one or more apparatuses to perform a method in accordance with any one of Clauses 1-19.

Clause 25: One or more computer program products embodied on one or more computer-readable storage media comprising code for performing a method in accordance with any one of Clauses 1-19.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured to estimate an egocentric gaze of a user in an environment, comprising:
    one or more memories configured to store a video input corresponding to the environment and an audio input corresponding to the environment; and
    one or more processors, coupled to the one or more memories, configured to:
        input, into a machine learning (ML) architecture, the video input and the audio input;
        generate one or more generated visual features using a conditional generative adversarial network (GAN) of the ML architecture with one or more visual features and one or more audio features as input to the conditional GAN, the one or more visual features corresponding to the video input and the one or more audio features corresponding to the audio input; and
        obtain, from the ML architecture, an estimate of the egocentric gaze of the user in the environment based on the one or more generated visual features.

2. The apparatus of claim 1, wherein the audio input comprises a plurality of audio channels.

3. The apparatus of claim 1, wherein:
the video input comprises the one or more visual features; and
the audio input comprises the one or more audio features.

4. The apparatus of claim 1, wherein:
the video input comprises one or more video frames;
the audio input comprises one or more audio channels; and
the one or more processors are configured to:
extract the one or more visual features from the video input; and
extract the one or more audio features from the audio input.

5. The apparatus of claim 1, wherein to obtain the estimate comprises to:
concatenate the one or more visual features with the one or more audio features to generate audio-visual correlated features, wherein the estimate is based on the audio-visual correlated features.

6. The apparatus of claim 5, wherein to concatenate the one or more visual features with the one or more audio features comprises to concatenate the one or more visual features with the one or more audio features using an attention mechanism of the ML architecture.

7. The apparatus of claim 6, wherein the attention mechanism comprises at least one of a self-attention mechanism, a cross-attention mechanism, a single-head attention mechanism, or a multi-head attention mechanism.

8. The apparatus of claim 5, wherein to obtain the estimate comprises to:
input the audio-visual correlated features into a gaze estimation decoder configured to output the estimate based on the audio-visual correlated features.

9. The apparatus of claim 1, wherein to obtain the estimate comprises to:
input the one or more generated visual features into a gaze estimation decoder configured to output the estimate based on at least the one or more generated visual features.

10. The apparatus of claim 5, wherein to obtain the estimate comprises to:
concatenate the one or more generated visual features with the audio-visual correlated features to generate audio-visual spatial-temporal features, wherein the estimate is based on the audio-visual spatial-temporal features.

11. The apparatus of claim 10, wherein to concatenate the one or more generated visual features with the audio-visual correlated features comprises to concatenate the one or more generated visual features with the audio-visual correlated features using an attention mechanism of the ML architecture.

12. The apparatus of claim 10, wherein to obtain the estimate comprises to:
input the audio-visual spatial-temporal features into a gaze estimation decoder configured to output the estimate based on the audio-visual spatial-temporal features.

13. The apparatus of claim 1, wherein the estimate comprises a gaze predicted two-dimensional (2D) heatmap that indicates a probability distribution of the egocentric gaze within a video frame.

14. The apparatus of claim 1, wherein:
the ML architecture comprises the GAN, a gaze estimation decoder, and an attention mechanism; and
the one or more processors are configured to:
train the conditional GAN using a first loss function;
train the gaze estimation decoder using a second loss function; and
train the attention mechanism using a third loss function.

15. The apparatus of claim 14, wherein to train the gaze estimation decoder comprises to train the gaze estimation decoder on a training dataset comprising egocentric video frames, audio signals, and ground truth gaze labels.

16. A method for estimating an egocentric gaze of a user in an environment, comprising:
inputting, into a machine learning (ML) architecture, a video input and an audio input;
generating one or more generated visual features using a conditional generative adversarial network (GAN) of the ML architecture with one or more visual features and one or more audio features as input to the conditional GAN, the one or more visual features corresponding to the video input, and the one or more audio features corresponding to the audio input; and
obtaining, from the ML architecture, an estimate of the egocentric gaze of the user in the environment based on the one or more generated visual features.

17. The method of claim 16, wherein obtaining the estimate comprises:
concatenating the one or more visual features with the one or more audio features to generate audio-visual correlated features, wherein the estimate is further based on the audio-visual correlated features.

18. The method of claim 17, wherein concatenating the one or more visual features with the one or more audio features comprises concatenating the one or more visual features with the one or more audio features using an attention mechanism of the ML architecture.

19. The method of claim 18, wherein the attention mechanism comprises at least one of a self-attention mechanism, a cross-attention mechanism, a single-head attention mechanism, or a multi-head attention mechanism.

20. The method of claim 17, wherein obtaining the estimate comprises:
inputting the audio-visual correlated features into a gaze estimation decoder configured to output the estimate based on at least the audio-visual correlated features.

* * * * *